(12) United States Patent
Omori et al.

(10) Patent No.: US 11,502,725 B2
(45) Date of Patent: Nov. 15, 2022

(54) NETWORK INSPECTION SYSTEM AND COMPUTER READABLE MEDIUM

(71) Applicant: Mitsubishi Electric Corporation, Tokyo (JP)

(72) Inventors: Yasuhiro Omori, Tokyo (JP); Yuta Atobe, Tokyo (JP); Yuki Okanami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/379,751

(22) Filed: Jul. 19, 2021

(65) Prior Publication Data

US 2021/0351813 A1   Nov. 11, 2021

Related U.S. Application Data

(63) Continuation of application No. PCT/JP2019/008530, filed on Mar. 5, 2019.

(51) Int. Cl.
*H04B 3/46* (2015.01)
*H04L 9/40* (2022.01)

(52) U.S. Cl.
CPC ............. *H04B 3/46* (2013.01); *H04L 63/162* (2013.01)

(58) Field of Classification Search
CPC ....... H04B 3/46; H04L 63/1441; H04L 67/12; H04L 63/162; H04L 63/164
See application file for complete search history.

(56) References Cited

U.S. PATENT DOCUMENTS

| 9,942,248 | B1* | 4/2018 | Umland | H04L 63/1425 |
| 2009/0249482 | A1* | 10/2009 | Sarathy | H04L 63/102 726/22 |
| 2015/0062335 | A1* | 3/2015 | Murakami | H04N 5/23203 348/143 |
| 2020/0233019 | A1 | 7/2020 | Atobe | |

(Continued)

FOREIGN PATENT DOCUMENTS

| JP | 2-234521 A | 9/1990 |
| JP | 2005-45541 A | 2/2005 |
| JP | 2010-164427 A | 7/2010 |

(Continued)

OTHER PUBLICATIONS

International Search Report for PCT/JP2019/008530 (PCT/ISA/210) dated May 14, 2019.

*Primary Examiner* — Khanh C Tran
(74) *Attorney, Agent, or Firm* — Birch, Stewart, Kolasch & Birch, LLP

(57) ABSTRACT

An inspection control unit (210) checks a communication status of a communication network (101, 102) to which one or more nodes are connected and determines, based on the communication status, whether inspection of the communication network is possible. When it is determined that inspection of the communication network is possible, the inspection control unit outputs a basic signal, which is a pulse signal for inspecting the communication network, to the communication network. An inspecting unit (220) accepts an inspection signal, which is a basic signal with a waveform changed by flowing through the communication network, and determines, based on the waveform of the inspection signal, whether a new node connected to the communication network is present.

14 Claims, 20 Drawing Sheets

(56) References Cited

FOREIGN PATENT DOCUMENTS

| | | |
|---|---|---|
| JP | 2014-32072 A | 2/2014 |
| JP | 2015-118045 A | 6/2015 |
| JP | 2018-31718 A | 3/2018 |
| JP | 6373529 B1 | 8/2018 |
| WO | WO 2018/146747 A1 | 8/2018 |
| WO | WO 2018/146845 A1 | 8/2018 |

\* cited by examiner

NETWORK INSPECTION SYSTEM AND COMPUTER READABLE MEDIUM

CROSS REFERENCE TO RELATED APPLICATION

This application is a Continuation of PCT International Application No. PCT/JP2019/008530, filed on Mar. 5, 2019, which is hereby expressly incorporated by reference into the present application.

TECHNICAL FIELD

The present invention relates to detection of an unauthorized node connected to a communication network.

BACKGROUND ART

When an unauthorized node is connected to a communication network such as an in-vehicle network, there is a possibility that normal process becomes unperformed in the communication network.

Thus, detecting an unauthorized node connected to the communication network is important.

CITATION LIST

Patent Literature

Patent Literature 1: JP 2018-031718

SUMMARY OF INVENTION

Technical Problem

As a technique for detecting a failure in nodes arranged on a power transmission line, a technique called TDR has been known. In TDR, a failure of a node is detected based on a change in the waveform of a pulse signal caused to flow through the power transmission line. TDR is an abbreviation of Time Domain Reflectometry.

In Patent Literature 1, a technique regarding TDR is disclosed. Specifically, a scheme of identifying a location of occurrence of an accident based on a reflection time of a pulse wave outputted to a power transmission line is disclosed.

However, TDR is a technique targeted at power transmission lines, and cannot be applied to communication networks as it is. For example, when TDR is applied to a communication network as it is, there is a possibility that communication in the communication network is affected by TDR to become unperformed normally.

An object of the present invention is to allow an unauthorized node to be detected without affecting communication in a communication network.

Solution to Problem

A network inspection system of the present invention includes:
  a communication status checking unit to check a communication status of a communication network to which one or more nodes are connected and to determine, based on the communication status, whether inspection of the communication network is possible;
  a basic signal output unit to output, when it is determined that inspection of the communication network is possible, a basic signal, which is a pulse signal for inspecting the communication network, to the communication network; and
  a node determining unit to accept an inspection signal, which is a basic signal with a waveform changed by flowing through the communication network, and to determine, based on the waveform of the inspection signal, whether a new node connected to the communication network is present.

Advantageous Effects of Invention

According to the present invention, it is possible to detect an unauthorized node (new node) without affecting communication in a communication network.

DESCRIPTION OF EMBODIMENTS

Figure 1:
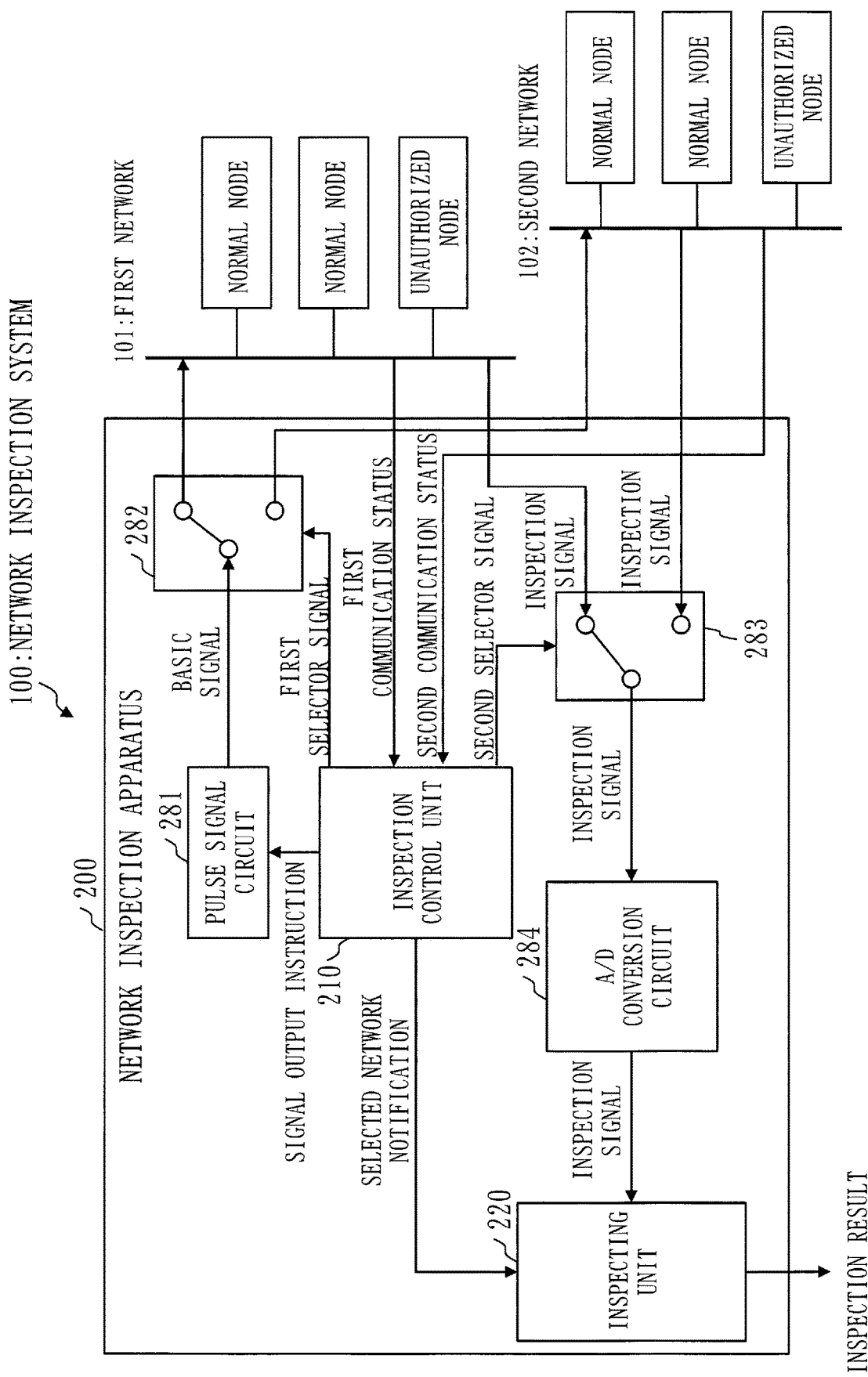
FIG. 1 is a structure diagram of a network inspection system 100 in Embodiment 1.

In embodiments and drawings, identical components or corresponding components are provided with the same reference character. Description of a component provided with the same reference character as that of a described component is omitted or simplified as appropriate. An arrow in a drawing mainly indicates a flow of data or a flow of process.

Embodiment 1

A mode for detecting an unauthorized node connected to a communication network is described based on FIG. 1 to FIG. 6.

*Description of Structure*

Based on FIG. 1, the structure of a network inspection system 100 is described.

The network inspection system 100 has one or more communication networks.

Specifically, the network inspection system 100 has a first network 101 and a second network 102.

However, the network inspection system 100 may have one communication network or three or more communication networks.

For example, the communication network is an in-vehicle network. A specific in-vehicle network is Controller Area Network (CAN).

To each communication network, one or more nodes are connected. For example, the node is an in-vehicle device.

A "normal node" is a node that has been connected to the communication network, and is connected to the communication network with authority.

An "unauthorized node" is a node newly connected to the communication network, and connected to the communication network without authority.

The network inspection system 100 includes a network inspection apparatus 200 for detecting an unauthorized node.

Figure 2:
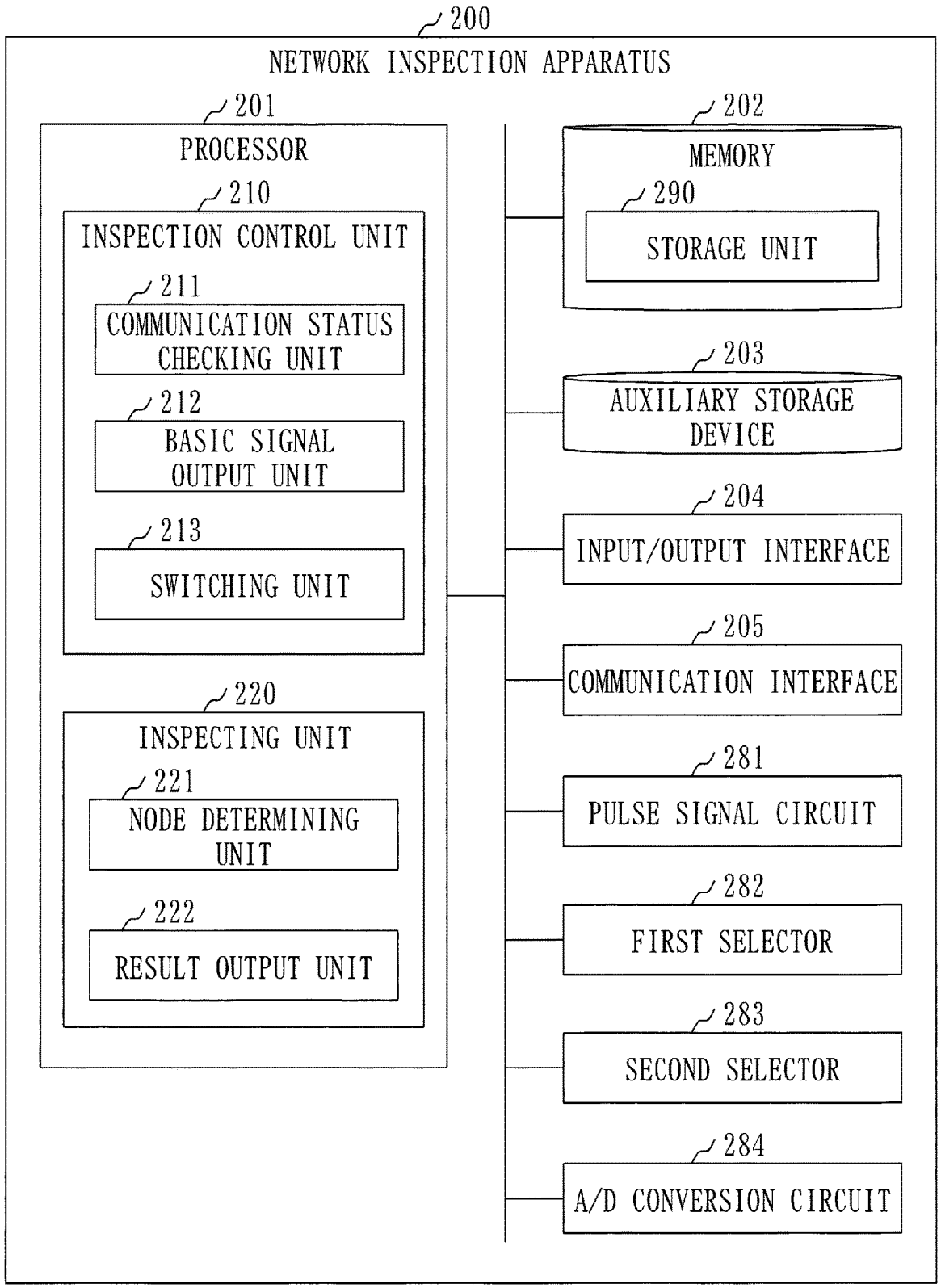
FIG. 2 is a structure diagram of a network inspection apparatus 200 in Embodiment 1.

Based on FIG. 2, the structure of the network inspection apparatus 200 is described.

The network inspection apparatus 200 is a computer including pieces of hardware such as a processor 201, a memory 202, an auxiliary storage device 203, an input/output interface 204, a communication interface 205, and various circuits. These pieces of hardware are connected to one another via a signal line.

Specifically, the network inspection apparatus 200 includes circuits such as a pulse signal circuit 281, a first selector 282, a second selector 283, and an A/D conversion circuit 284.

The processor 201 is an IC which performs arithmetic processing, and controls the other pieces of hardware. For example, the processor 201 is a CPU or DSP.

IC is an abbreviation of Integrated Circuit.
CPU is an abbreviation of Central Processing Unit.
DSP is an abbreviation of Digital Signal Processor.

The memory 202 is a volatile storage device. The memory 202 is also called a main storage device or main memory. For example, the memory 202 is a RAM. Data stored in the memory 202 is saved as required in the auxiliary storage device 203.

RAM is an abbreviation of Random Access Memory.

The auxiliary storage device 203 is a non-volatile storage device. For example, the auxiliary storage device 203 is a ROM, HDD, or flash memory. Data stored in the auxiliary storage device 203 is loaded as required in the memory 202.

ROM is an abbreviation of Read Only Memory.
HDD is an abbreviation of Hard Disk Drive.

The input/output interface 204 is a port to which an input device and an output device are connected. For example, the input/output interface 204 is a USB terminal, the input device is a keyboard and a mouse, and the output device is a display.

USB is an abbreviation of Universal Serial Bus.

The communication interface 205 is an interface for communication. For example, the communication interface 205 is a communication port. Inputs and outputs of signals between the network inspection apparatus 200 and each communication network are implemented by using the communication interface 205.

The pulse signal circuit 281 is a circuit which generates a pulse signal.

Each of the first selector 282 and the second selector 283 is a circuit which switches a communication network as a connection destination.

The A/D conversion circuit 284 is a circuit which converts an analog signal to digital data. The A/D conversion circuit is also called an A/D converter.

The network inspection apparatus 200 includes components such as an inspection control unit 210 and an inspecting unit 220. These components are implemented by software.

The inspection control unit 210 includes a communication status checking unit 211, a basic signal output unit 212, and a switching unit 213.

The inspecting unit 220 includes a node determining unit 221 and a result output unit 222.

In the auxiliary storage device 203, a network inspection program is stored for causing a computer to function as the inspection control unit 210 and the inspecting unit 220. The network inspection program is loaded into the memory 202 and executed by the processor 201.

In the auxiliary storage device 203, an OS is further stored. At least part of the OS is loaded into the memory 202 and executed by the processor 201.

The processor 201 executes the network inspection program while executing the OS.

OS is an abbreviation of Operation System.

Input/output data of the network inspection program is stored in a storage unit 290.

The memory 202 functions as the storage unit 290. However, in place of the memory 202 or together with the memory 202, storage devices such as the auxiliary storage device 203, a register in the processor 201, and a cash memory in the processor 201 may function as the storage unit 290.

The network inspection apparatus 200 may include a plurality of processors which replace the processor 201. The plurality of processors share the role of the processor 201.

The network inspection program can be recorded (stored) in a non-volatile recording medium such as an optical disc or flash memory so as to be computer-readable.

*Description of Operation*

The operation of the network inspection apparatus 200 corresponds to a network inspection method. Also, the procedure of the network inspection method corresponds to the procedure of the network inspection program.

Figure 3:
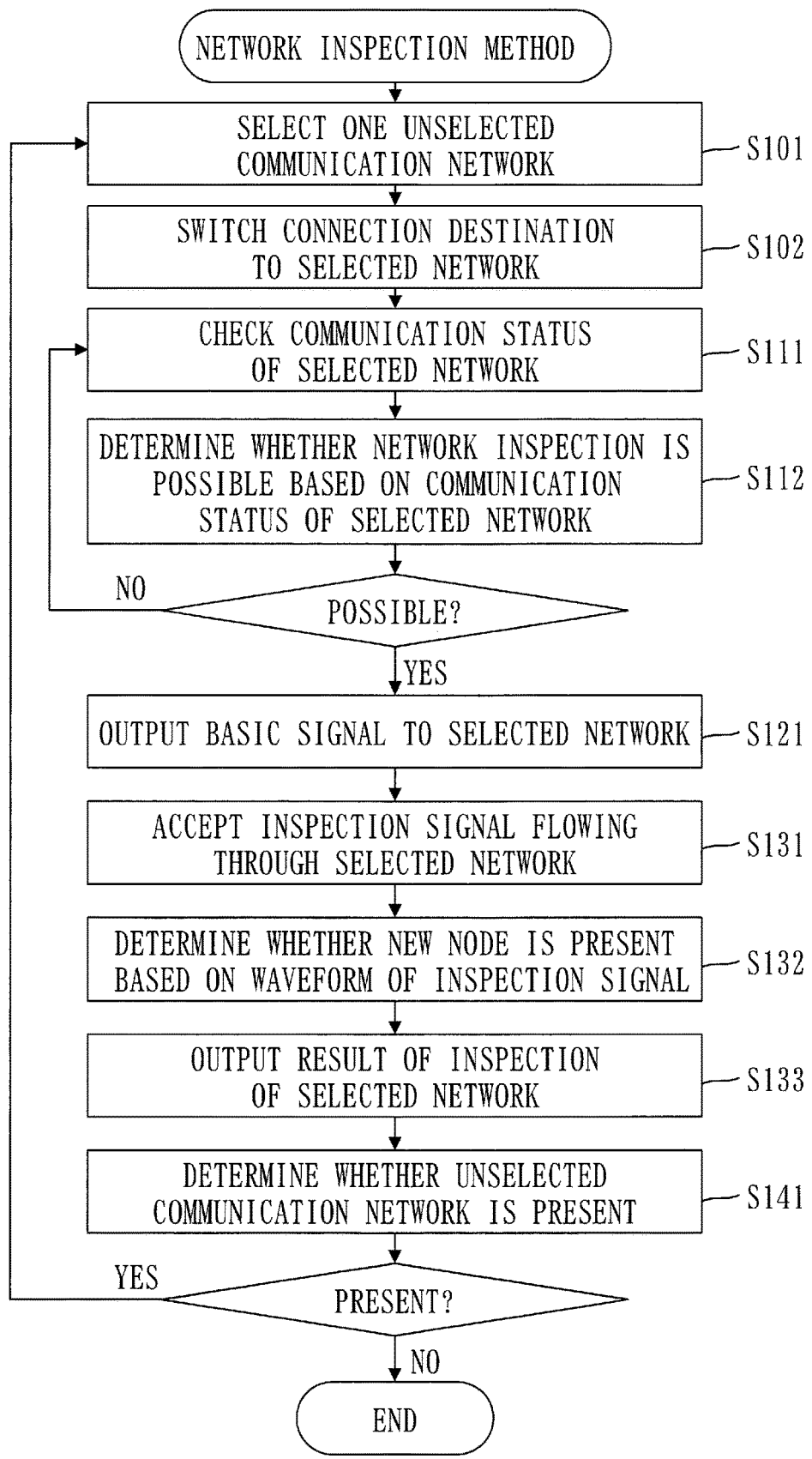
FIG. 3 is a flowchart of a network inspection method in Embodiment 1.

Based on FIG. 3, the network inspection method is described.

At step S101, the communication status checking unit 211 selects one unselected communication network.

The communication network selected at step S101 is referred to as a "selected network".

At step S102, the switching unit 213 switches a communication network as an output destination of a basic signal to the selected network. The basic signal is described further below.

Specifically, the switching unit 213 inputs a first selector signal specifying the selected network to the first selector 282. The first selector signal is a signal for controlling the first selector 282.

Then, the first selector 282 switches the connection destination to the selected network by following the first selector signal.

Furthermore, the switching unit 213 switches a communication network as an input source of an inspection signal to the selected network. The inspection signal is described further below.

Specifically, the switching unit 213 inputs a second selector signal specifying the selected network to the second selector 283. The second selector signal is a signal for controlling the second selector 283.

Then, the second selector 283 switches the connection destination to the selected network by following the second selector signal.

At step S111, the communication status checking unit 211 checks a communication status of the selected network.

At step S112, the communication status checking unit 211 determines whether inspection of the selected network is possible based on the communication status of the selected network.

When it is determined that inspection of the selected network is possible, the process proceeds to step S121.

When it is determined that inspection of the selected network is not possible, the process proceeds to step S111.

Checking a communication status is described further below.

At step S121, the basic signal output unit 212 outputs a basic signal to the selected network.

The basic signal is a pulse signal for inspecting the selected network, and has a time interval determined in advance. Specifically, the basic signal is a step wave.

Specifically, the basic signal output unit 212 inputs a signal output instruction to the pulse signal circuit 281. The signal output instruction is a signal for making an instruction for outputting a pulse signal as a basic signal.

Then, the pulse signal circuit 281 outputs a pulse signal having the time interval determined in advance. The pulse signal outputted from the pulse signal circuit 281 is a basic signal.

The basic signal outputted from the pulse signal circuit 281 passes through the first selector 282 and is inputted to the selected network.

At step S131, the node determining unit 221 accepts an inspection signal flowing through the selected network.

The inspection signal is a basic signal with its waveform changed by flowing through the selected network.

The node determining unit 221 accepts the inspection signal as follows.

The inspection signal flowing through the selected network passes through the second selector 283 and is inputted to the A/D conversion circuit 284.

The A/D conversion circuit 284 converts the inputted inspection signal from an analog signal to digital data, and outputs the digital data of the inspection signal. The digital data of the inspection signal is inputted from the A/D conversion circuit 284 to the node determining unit 221.

The node determining unit 221 accepts the inputted digital data of the inspection signal.

At step S132, the node determining unit 221 determines whether a new node connected to the selected network is present, based on the waveform of the inspection signal.

The node determining unit 221 makes a determination as follows.

The inspection control unit 210 notifies the inspecting unit 220 of the selected network. For example, the switching unit 213 notifies the node determining unit 221 of the selected network at step S102.

The node determining unit 221 compares the waveform of the inspection signal represented by the digital data with the waveform of a reference signal for the selected network, and makes a determination based on the comparison result.

Figure 4:
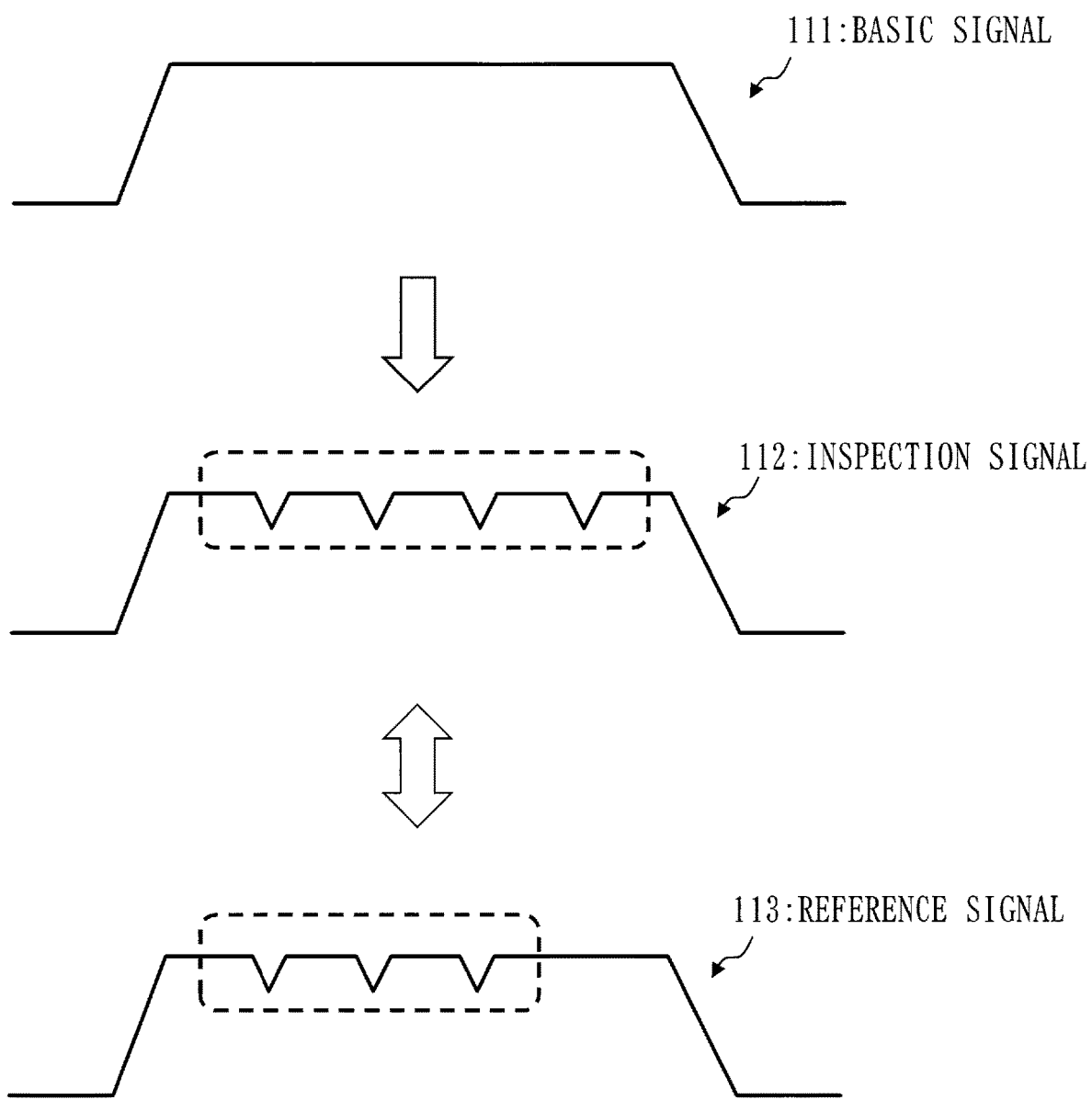
FIG. 4 is a relation diagram of various signals in Embodiment 1.

Based on FIG. 4, a relation among a basic signal 111, an inspection signal 112, and a reference signal 113 is described.

The basic signal 111 is a pulse signal having the time interval determined in advance.

The inspection signal 112 is a basic signal with its waveform changed by flowing through the selected network. The waveform of the inspection signal 112 includes reflection by a node group (including an unauthorized node) connected to the selected network. In FIG. 4, the waveform of the inspection signal 112 includes four reflections by four nodes.

The reference signal 113 is an inspection signal corresponding to the selected network to which only a normal node group is connected. The waveform of the reference signal 113 includes reflection by the normal node group connected to the selected network. In FIG. 4, the waveform of the reference signal 113 includes three reflections by three normal nodes.

The node determining unit 221 analyzes the impedance of the waveform of each of the inspection signal 112 and the reference signal 113. Then, the node determining unit 221 compares the number of reflections included in the waveform of the inspection signal 112 with the number of reflections included in the waveform of the reference signal 113.

When the number of reflections included in the waveform of the inspection signal 112 is larger than the number of reflections included in the waveform of the reference signal 113, the node determining unit 221 determines that a new node (unauthorized node) connected to the selected network is present.

When the number of reflections included in the waveform of the inspection signal 112 is equal to the number of reflections included in the waveform of the reference signal 113, the node determining unit 221 determines that a new node (unauthorized node) connected to the selected network is not present.

When the number of reflections included in the waveform of the inspection signal 112 is smaller than the number of reflections included in the waveform of the reference signal 113, the node determining unit 221 determines that the normal node group connected to the selected network has been changed.

In FIG. 4, in the waveform of the inspection signal 112, four reflections by four nodes are included. On the other hand, in the waveform of the reference signal 113, three reflections by three normal nodes are included.

Therefore, the node determining unit 221 determines that a new node (unauthorized node) connected to the selected network is present.

Referring back to FIG. 3, description continues from step S133.

At step S133, the result output unit 222 outputs the result of inspection of the selected network. That is, the result output unit 222 outputs the inspection result indicating whether a new node connected to the selected network is present.

For example, the result output unit 222 causes the display to display the result of inspection of the selected network.

At step S141, the communication status checking unit 211 determines whether an unselected communication network is present.

When an unselected communication network is present, the process proceeds to step S101.

When an unselected communication network is not present, the process ends.

Figure 5:
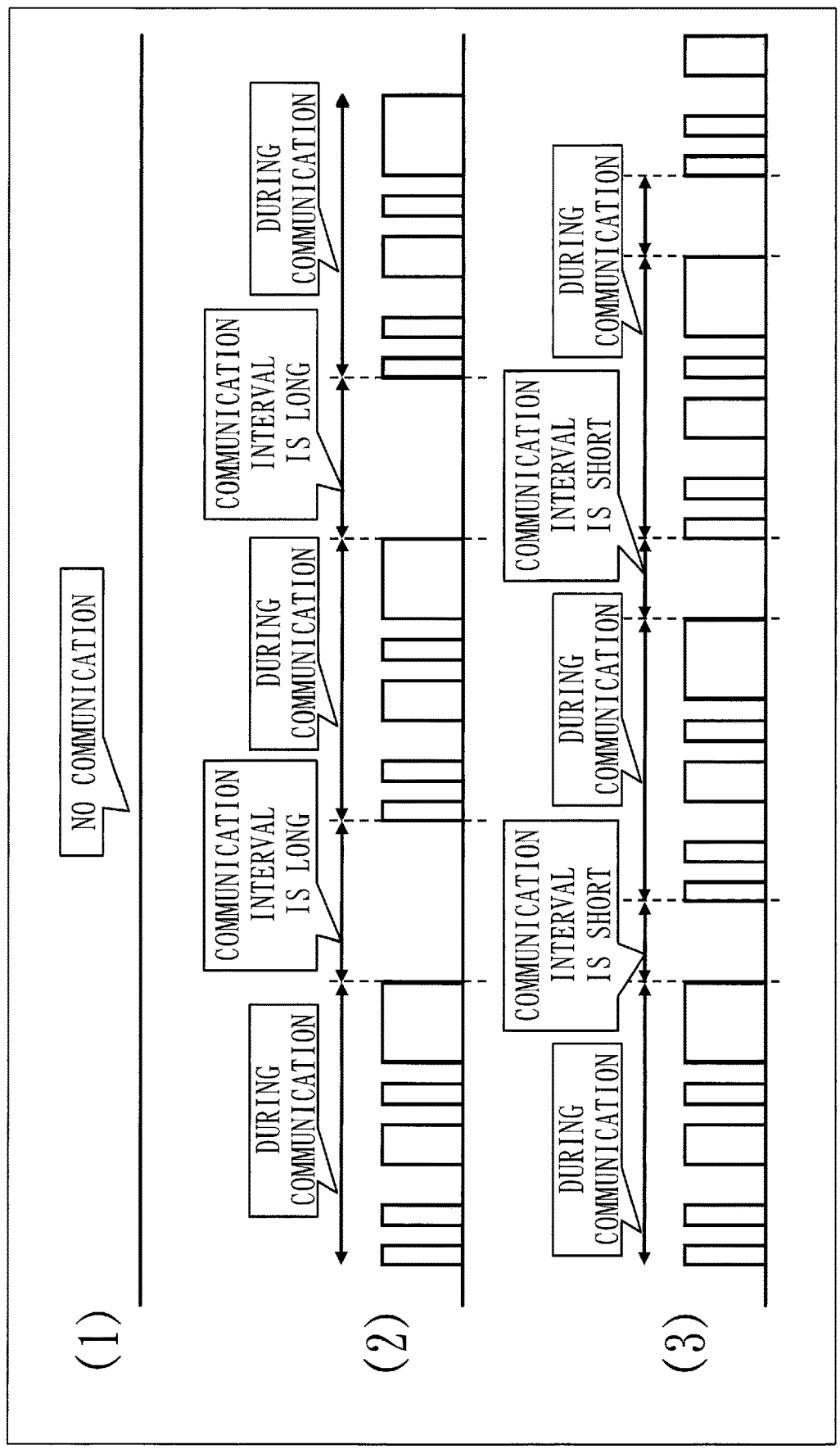
FIG. 5 is a descriptive diagram of checking a communication status in Embodiment 1.
Figure 6:
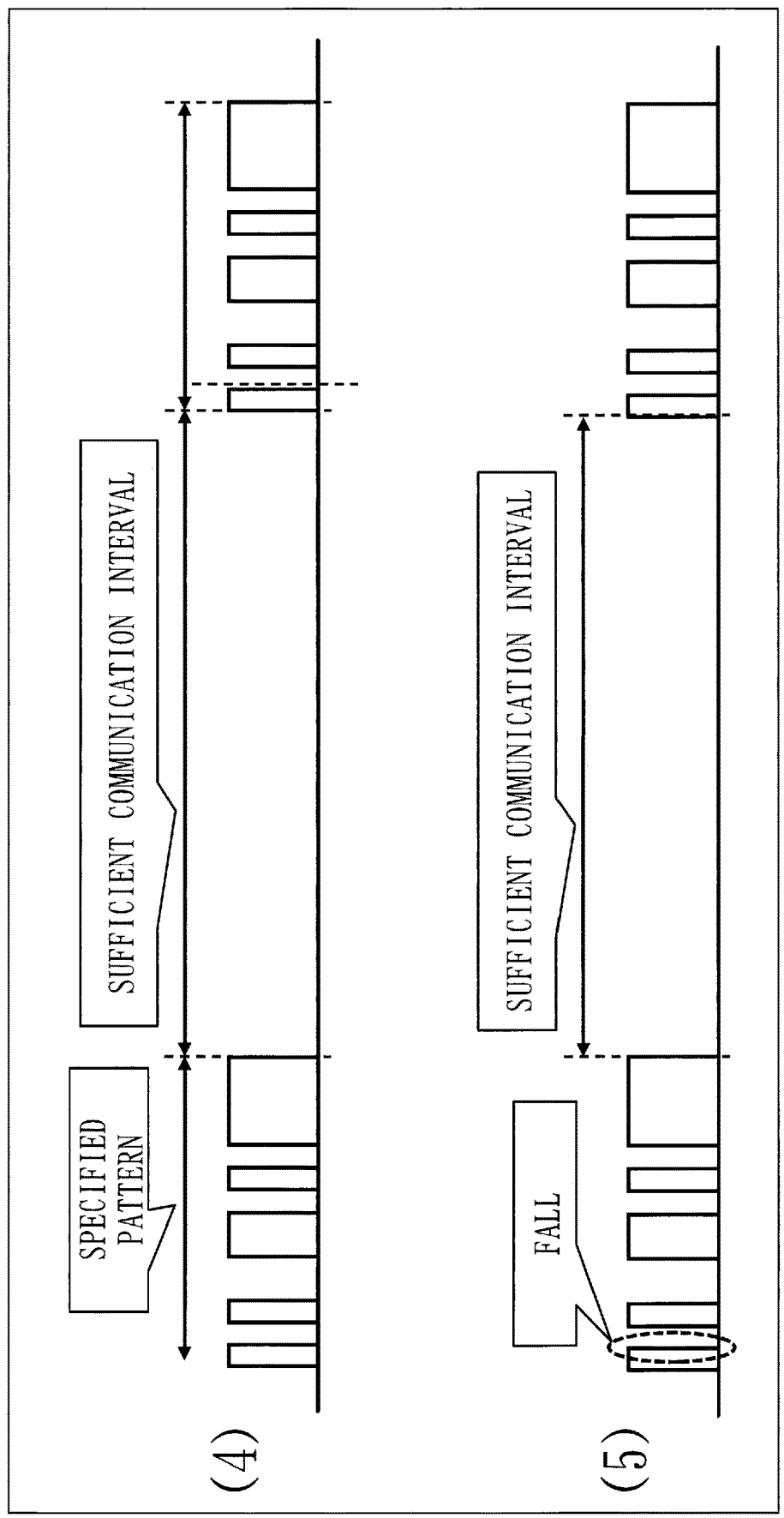
FIG. 6 is a descriptive diagram of checking the communication status in Embodiment 1.

Based on FIG. 5 and FIG. 6, checking a communication status (step S111 and step S112) is described.

The communication status checking unit 211 checks a communication status of the selected network in a check time. The check time has a time length determined in advance.

Specifically, the communication status checking unit 211 checks, as a communication status, the presence or absence of communication, a communication time interval, a communication voltage pattern, or the like.

In (1) of FIG. 5, the communication status checking unit 211 checks, in the check time, whether communication in the selected network is present.

If communication has not occurred in the selected network in the check time, the communication status checking unit 211 determines that inspection of the selected network is possible.

In (2) of FIG. 5, the communication status checking unit 211 checks, in the check time, a communication time interval (communication interval) in the selected network.

When the communication interval in the check time is longer than a specified interval, the communication status checking unit 211 determines that inspection of the selected network is possible.

The specified interval is a time sufficient for network inspection, and is determined in advance.

In (3) of FIG. 5, the communication status checking unit 211 checks, in the check time, a communication time interval (communication interval) in the selected network.

When the communication interval in the check time is shorter than the specified interval, the communication status checking unit 211 determines that inspection of the selected network is not possible.

In (4) of FIG. 6, if communication with a voltage pattern (specified pattern) determined in advance has occurred, a communication interval more than or equal to the specified interval is allocated in a period until the next communication. This specification is set in advance in each node.

The communication status checking unit 211 checks, in the check time, a communication voltage pattern in the selected network.

If communication with the specified pattern has occurred in the check time, the communication status checking unit 211 determines, at the time of detection of communication with the specified pattern, that inspection of the selected network is possible.

In (5) of FIG. 6, if communication has occurred, a communication interval more than or equal to the specified interval is allocated in a period until the next communication. This specification is set in advance in each node.

The communication status checking unit 211 checks, in the check time, a communication voltage pattern in the selected network.

If fall of the communication signal has occurred in the check time, the communication status checking unit 211 determines, at the time of detection of the end of the communication signal, that inspection of the selected network is possible.

\*\*\*Effect of Embodiment 1\*\*\*

The network inspection apparatus 200 views the communication status of the communication network, and detects a state in which TDR can be performed. This allows an unauthorized node to be detected without affecting communication.

By controlling the first selector 282 and the second selector 283, the inspection control unit 210 switches the communication network as a connection destination. This allows inspection of a plurality of communication networks even if a plurality of pulse signal circuits 281, A/D conversion circuits 284, and inspecting units 220 are not prepared.

That is, TDR can be performed on a plurality of communication networks with a small number of components. Thus, it is possible to achieve a decrease in cost and space saving of the network inspection apparatus 200. And, the network inspection apparatus 200 can be implemented by an embedded device. For example, the network inspection apparatus 200 can be implemented as a function of an ECU. ECU is an abbreviation of Electronic Control Unit.

Embodiment 2

As for a mode in which an A/D converter with low accuracy is used, differences from Embodiment 1 are mainly described based on FIG. 7 to FIG. 11.

\*\*\*Description of Structure\*\*\*

Figure 7:
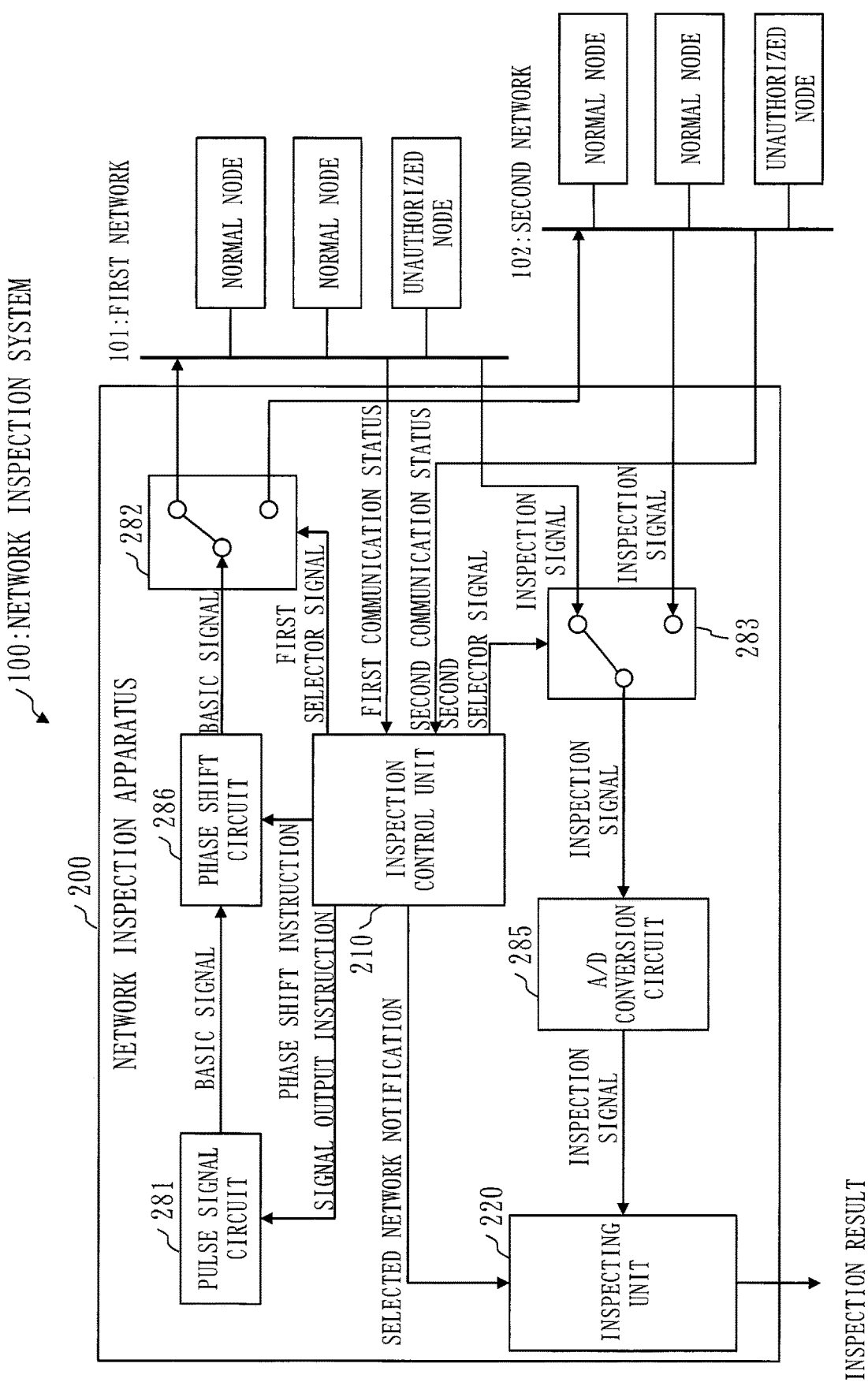
FIG. 7 is a structure diagram of the network inspection system 100 in Embodiment 2.

Based on FIG. 7, the structure of the network inspection system 100 is described.

The structure of the network inspection system 100 is identical to the structure in Embodiment 1, except part of the network inspection apparatus 200 (refer to FIG. 1).

Figure 8:
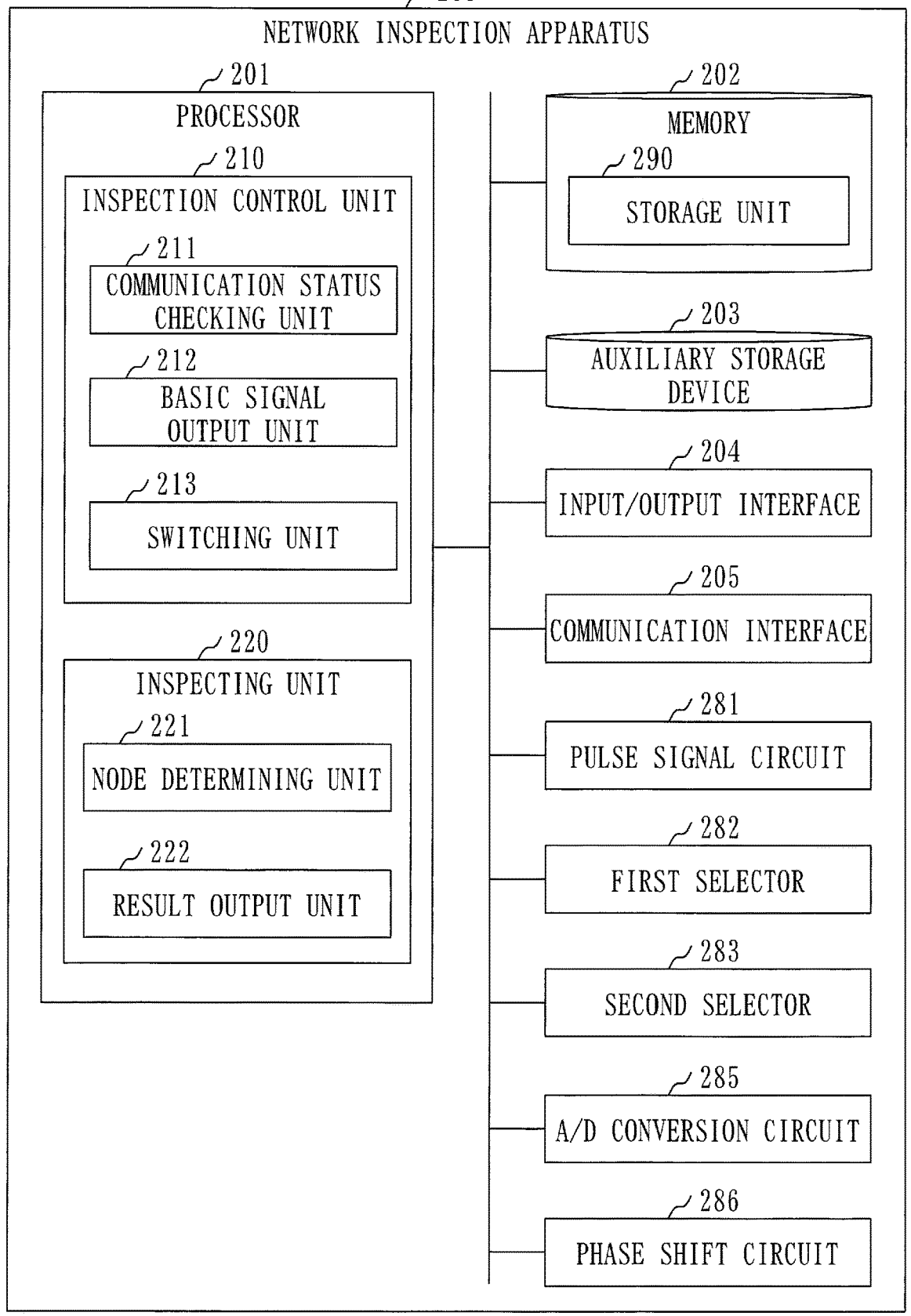
FIG. 8 is a structure diagram of the network inspection apparatus 200 in Embodiment 2.

Based on FIG. 8, the structure of the network inspection apparatus 200 is described.

The network inspection apparatus 200 includes an A/D conversion circuit 285 in place of the A/D conversion circuit 284.

The A/D conversion circuit 284 is an A/D converter with high accuracy, and its sampling interval is short.

The A/D conversion circuit 285 is an A/D converter with low accuracy, and its sampling interval is long.

For example, the sampling interval of the A/D conversion circuit 284 is 1 nanosecond, and the sampling interval of the A/D conversion circuit 285 is 10 nanoseconds.

The network inspection apparatus 200 further includes a phase shift circuit 286.

The phase shift circuit 286 is a circuit which shifts the phase of a basic signal outputted from the pulse signal circuit 281.

The other structures are identical to those in Embodiment 1 (refer to FIG. 2).

\*\*\*Description of Operation\*\*\*

Figure 9:
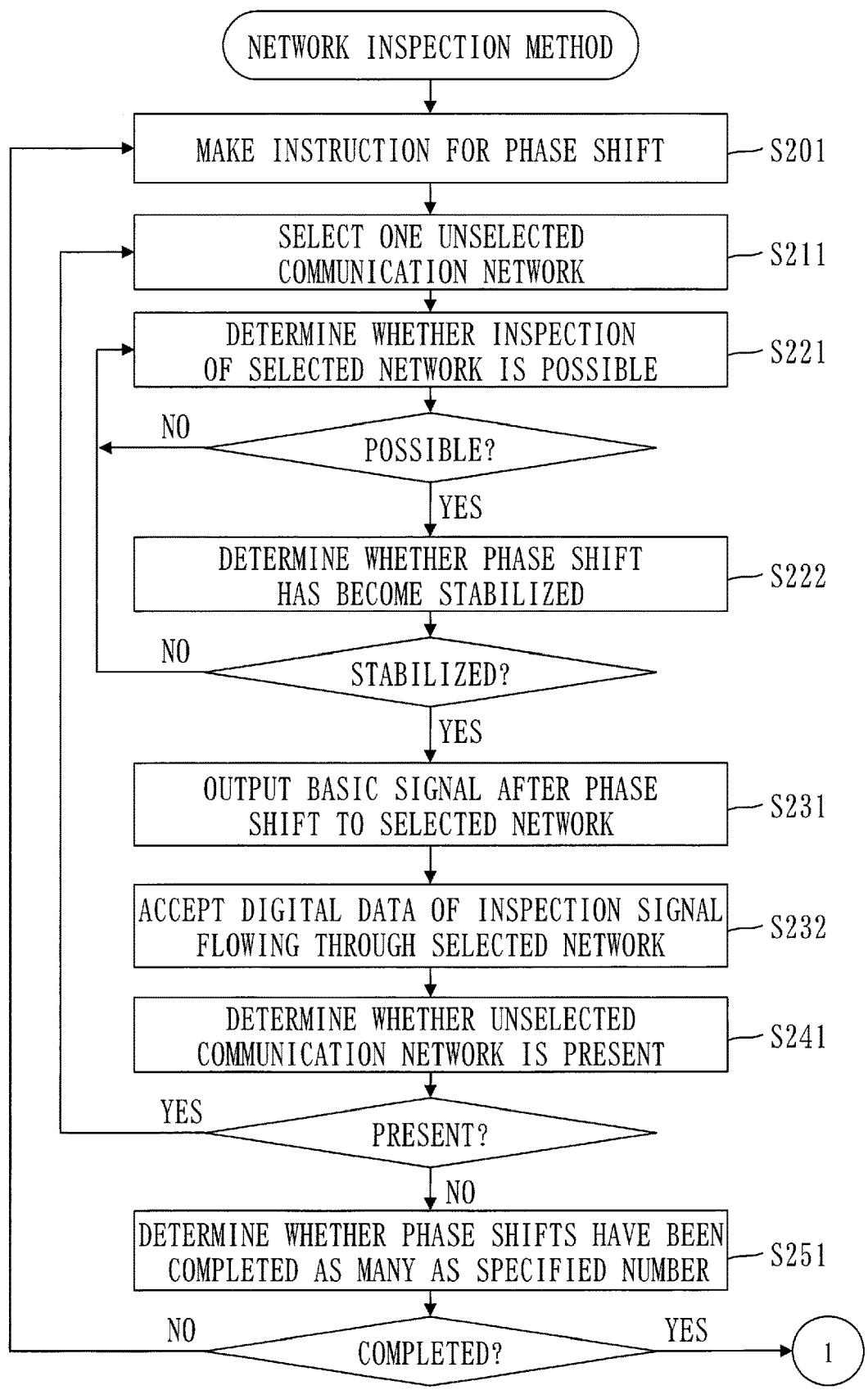
FIG. 9 is a flowchart of a network inspection method in Embodiment 2.
Figure 10:
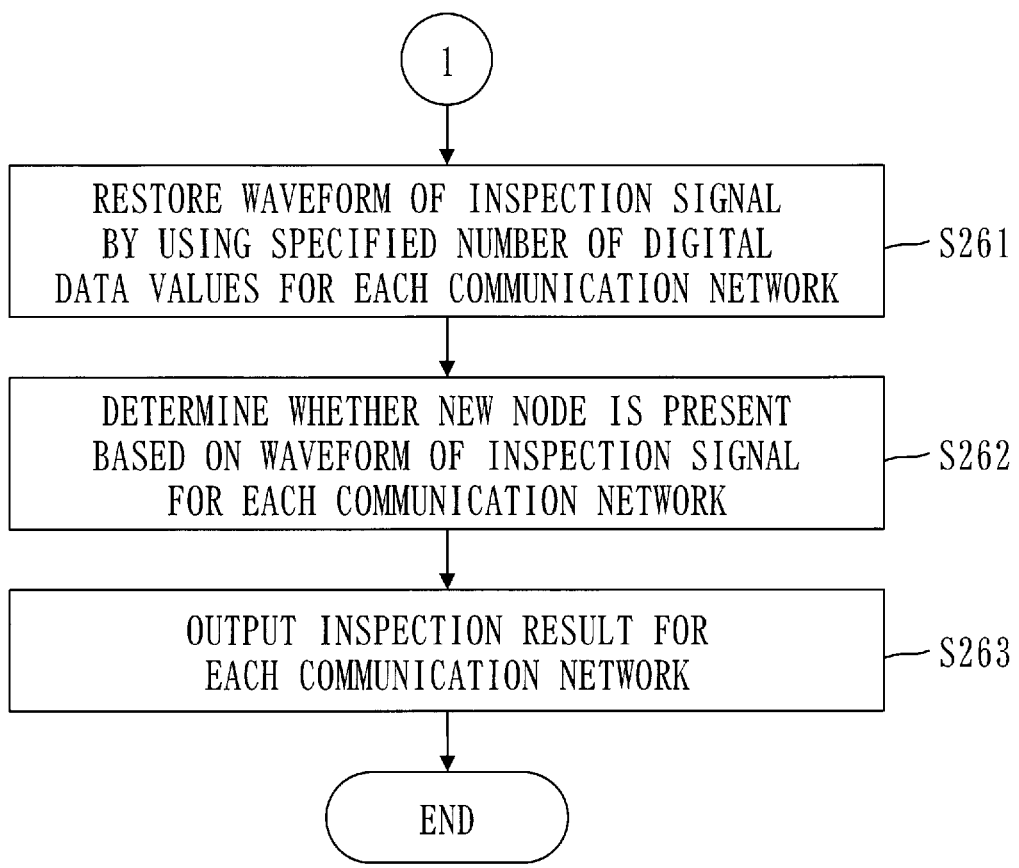
FIG. 10 is the flowchart of the network inspection method in Embodiment 2.

Based on FIG. 9 and FIG. 10, a network inspection method is described.

At step S201, the basic signal output unit 212 inputs a phase shift instruction to the phase shift circuit 286. The phase shift instruction is an instruction for shifting the phase of the basic signal by a specified amount.

Upon receiving the phase shift instruction, the phase shift circuit 286 performs circuit setting (phase setting) for phase shift. It takes some time after phase setting and until the operation of the phase shift circuit 286 is stabilized.

At step S211, the communication status checking unit 211 selects one unselected communication network. The switching unit 213 switches the connection destination to the selected network.

Step S211 is identical to the process in Embodiment 1 (step S101 and step S102).

At step S221, the communication status checking unit 211 determines whether inspection of the selected network is possible.

Step S221 is identical to the process in Embodiment 1 (step S111 and step S112).

When inspection of the communication network is possible, the process proceeds to step S222.

When inspection of the communication network is not possible, the process proceeds to step S221.

At step S222, the basic signal output unit 212 determines whether the phase shift has become stabilized.

Specifically, the basic signal output unit 212 compares an elapsed time after step S201 with a specified time.

The elapsed time after step S201 is a time elapsed after the phase shift instruction is inputted to the phase shift circuit 286.

The specified time is a time required until the operation of the phase shift circuit 286 becomes stabilized after phase setting, and is determined in advance.

When the elapsed time after step S201 exceeds the specified time, the basic signal output unit 212 determines that the phase shift has become stabilized.

When it is determined that the phase shift has become stabilized, the process proceeds to step S231.

When it is determined that the phase shift has not become stabilized, the process proceeds to step S221.

At step S231, the basic signal output unit 212 outputs a basic signal to the selected network.

Step S231 is identical to step S121 in Embodiment 1. However, the phase of the basic signal outputted to the selected network is shifted by the phase shift circuit 286.

That is, the basic signal output unit 212 outputs a basic signal after phase shift to the selected network.

At step S232, the node determining unit 221 accepts digital data of an inspection signal flowing through the selected network.

Step S232 is a process in which the A/D conversion circuit 284 at step S131 of Embodiment 1 is replaced by the A/D conversion circuit 285.

The digital data of the inspection signal indicates one or more sampling values of the inspection signal.

At step S241, the communication status checking unit 211 determines whether an unselected communication network is present.

When an unselected communication network is present, the process proceeds to step S211.

When an unselected communication network is not present, the process proceeds to step S251.

At step S251, the basic signal output unit 212 determines whether phase shifts have been completed as many as a specified number. The specified number is a number equal to or more than 2, and is determined in advance as the number of times of performing phase shift.

If phase shifts have been completed as many as the specified number, the process proceeds to step S261.

If phase shifts have not been completed as many as the specified number, the process proceeds to step S201.

In repeating the processes from step S201 to step S251, the basic signal output unit 212 outputs a plurality of basic signals to each communication network as shifting the phase.

At step S261, the node determining unit 221 restores the waveform of the inspection signal by using a specified number of pieces of digital data for each communication network.

Specifically, the node determining unit 221 arranges one or more sampling values indicated by the respective pieces of digital data in order of phase, thereby restoring the waveform of the inspection signal.

At step S262, the node determining unit 221 determines whether a new node is present, based on the waveform of the inspection signal for each communication network.

The method of determining whether a new node is present is identical to the method at step S132 of Embodiment 1.

At step S263, the result output unit 222 outputs the inspection result for each communication network. That is, the result output unit 222 outputs the inspection result indicating whether a new node is present for each communication network.

Figure 11:
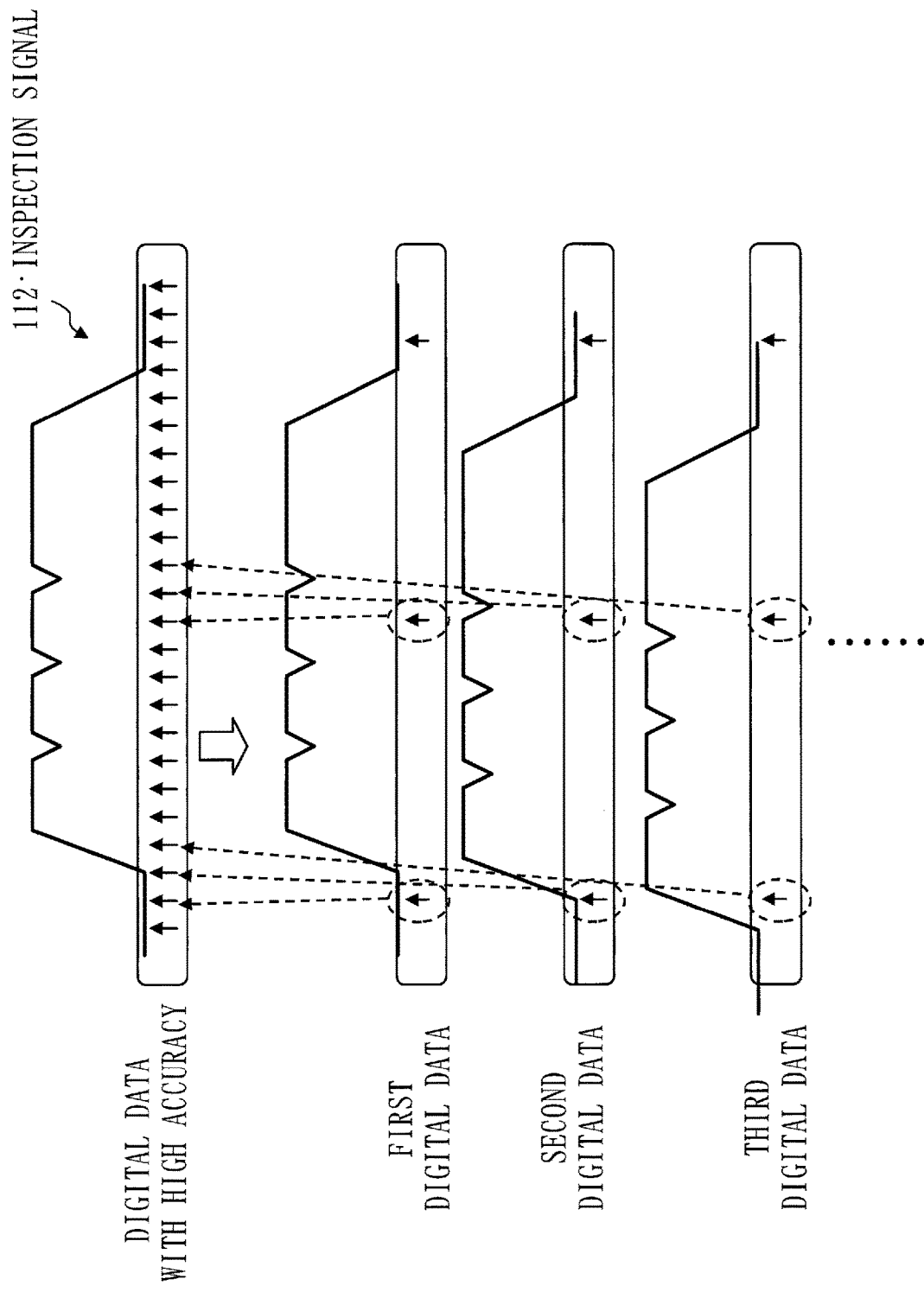
FIG. 11 is a descriptive diagram of restore of an inspection signal 112 in Embodiment 2.

Based on FIG. 11, a restore of the inspection signal 112 is described.

The digital data with high accuracy is digital data acquired by the A/D conversion circuit 284. The sampling interval of the A/D conversion circuit 284 is 1 nanosecond. Thus, the digital data with high accuracy indicates a sampling value at intervals of 1 nanosecond.

The n-th digital data is digital data acquired by the A/D conversion circuit 285 after the n-th phase shift. The sampling interval of the A/D conversion circuit 284 is 10 nanoseconds. Thus, the n-th digital data indicates a sampling value at intervals of 10 nanoseconds.

In this case, with a phase shift with 1 nanosecond performed ten times and the sampling values of the respective first digital data to tenth digital data arranged in order of phase, the inspection signal 112 equivalent to the digital data with high accuracy can be acquired.

*Effect of Embodiment 2*

From Embodiment 2, it is possible to detect an unauthorized node by using an A/D converter with low accuracy (A/D conversion circuit 285).

It takes time until the phase shift of the basic signal becomes stabilized. Thus, the basic signal output unit 212 instructs the phase shift circuit 286 to perform a phase shift before checking the communication status of the communication network starts. Then, the communication status checking unit 211 checks the communication status of the communication network by using a time until the phase shift becomes stabilized. This can prevent an increase in time until the inspection result is acquired.

Embodiment 3

Figure 12:
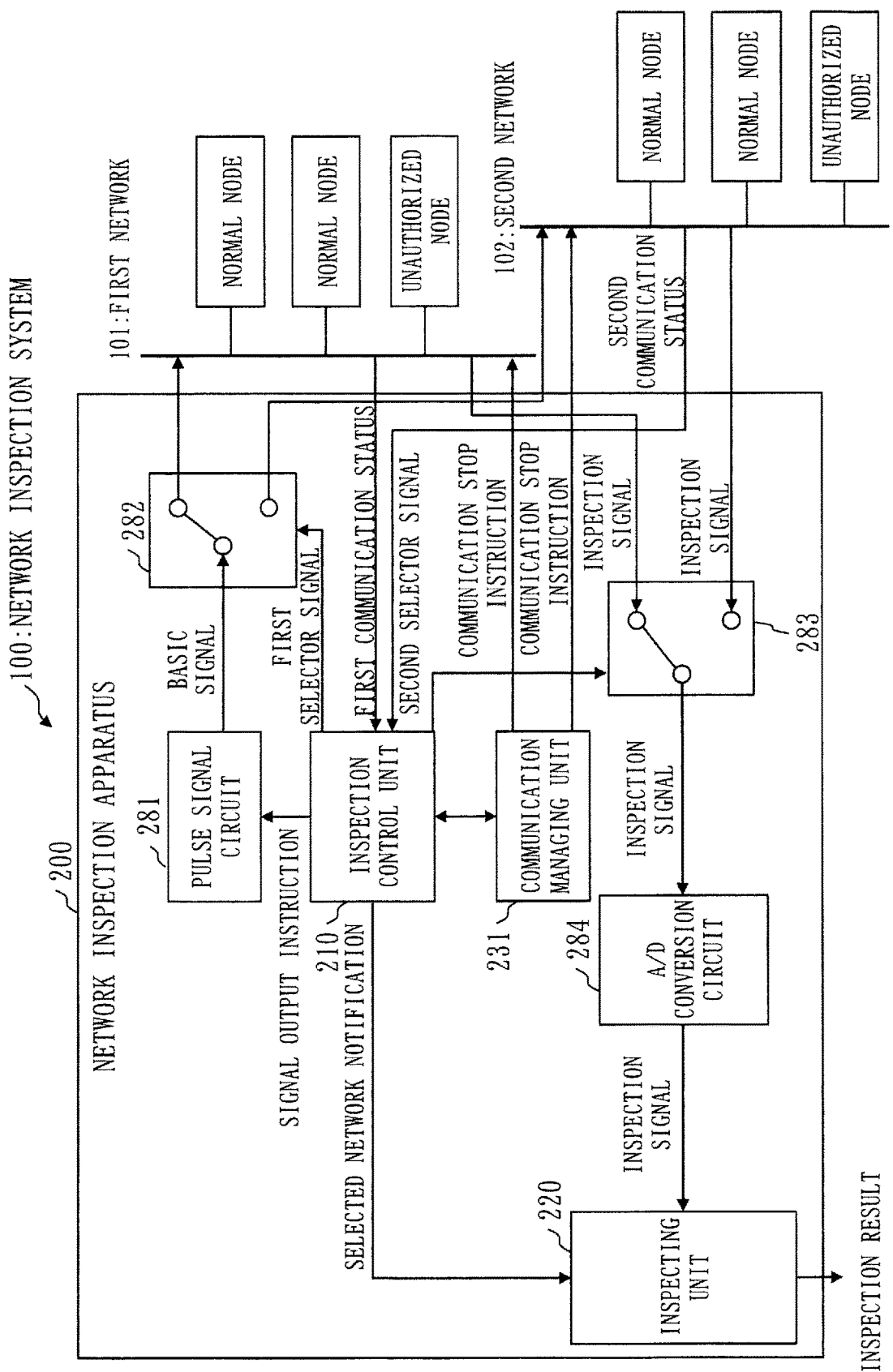
FIG. 12 is a structure diagram of the network inspection system 100 in Embodiment 3.
Figure 13:
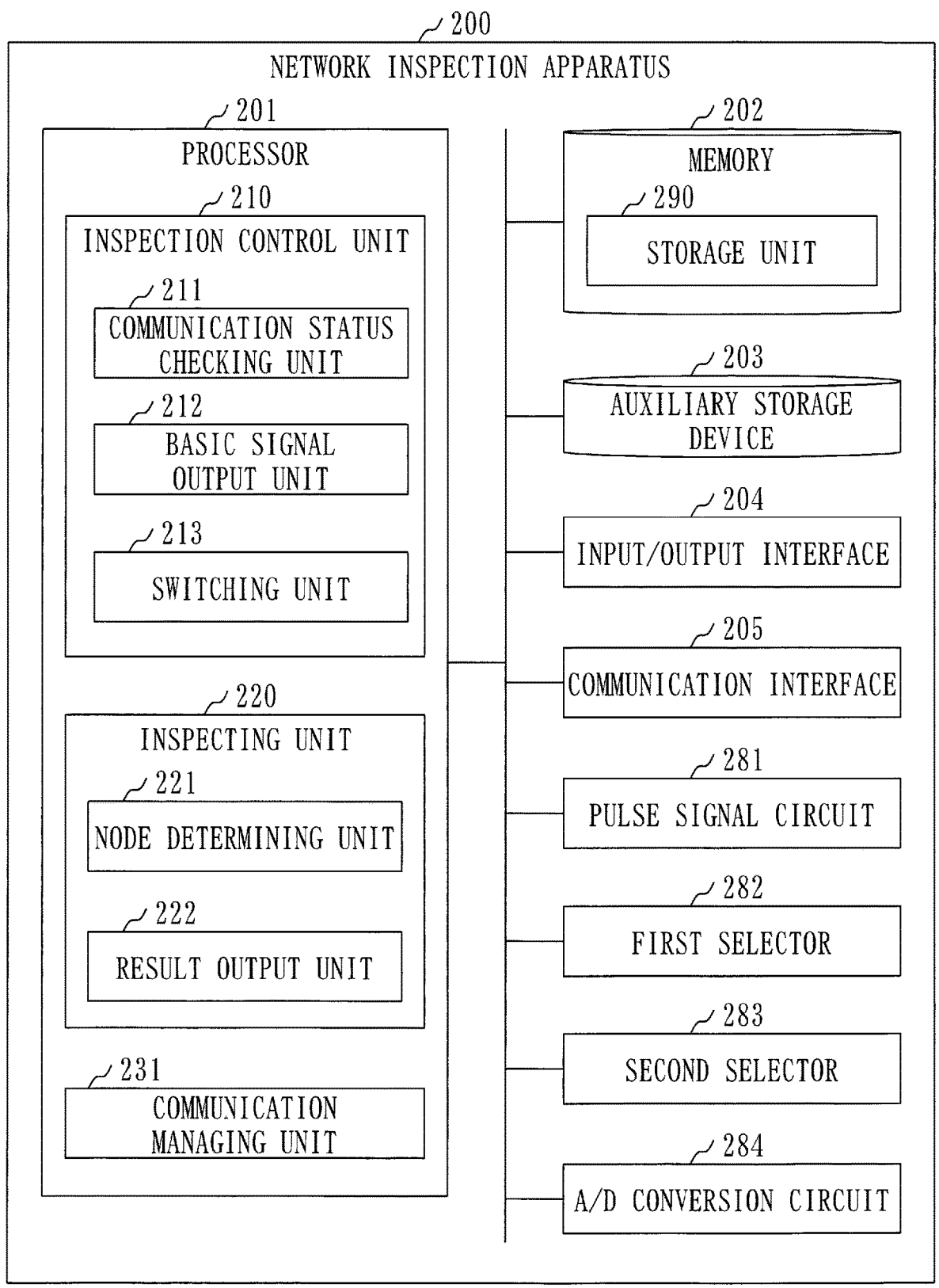
FIG. 13 is a structure diagram of the network inspection apparatus 200 in Embodiment 3.
Figure 14:
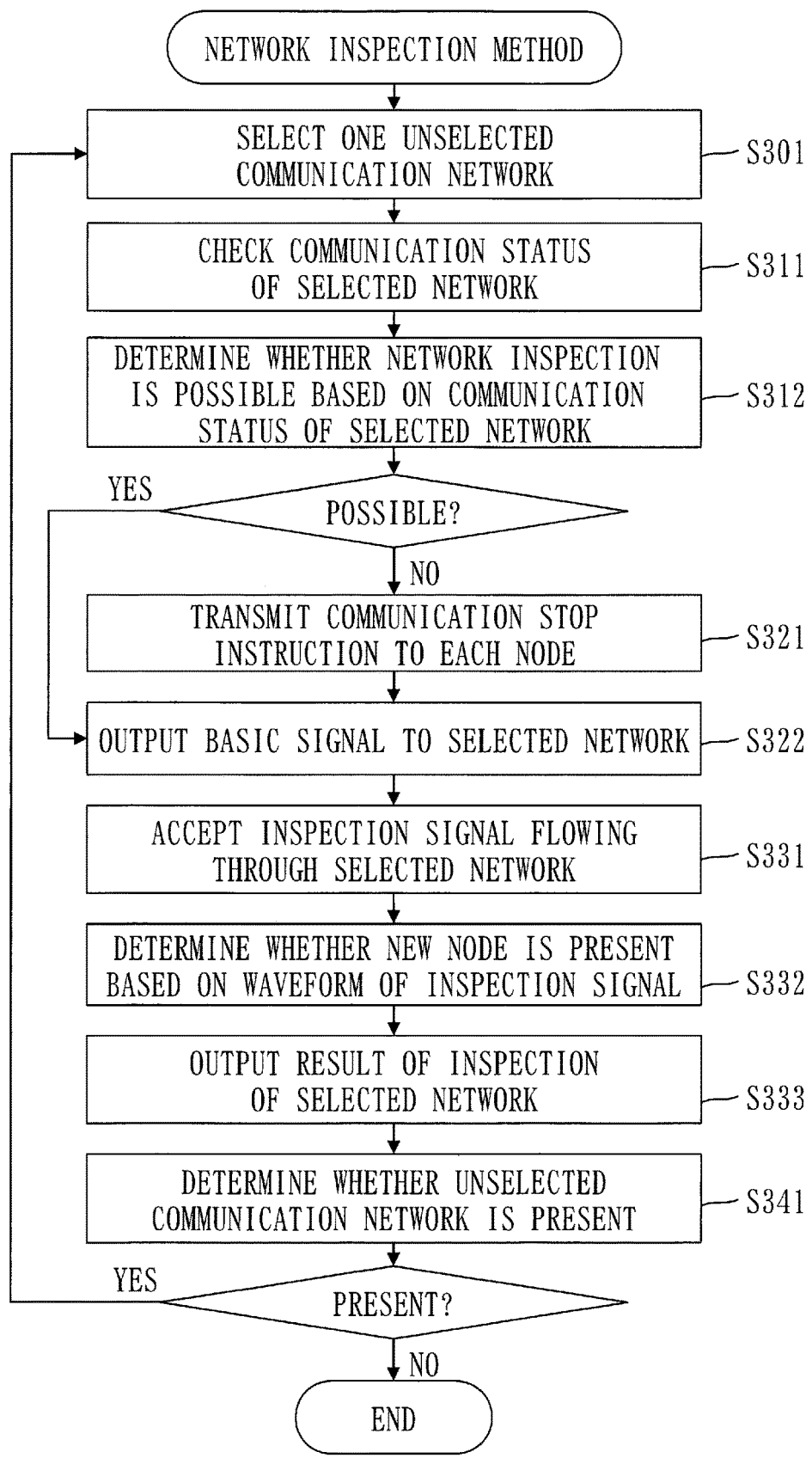
FIG. 14 is a flowchart of a network inspection method in Embodiment 3.

As for a mode of addressing a case in which network inspection cannot be performed because of being affected by the communication status, differences from Embodiment 1 are mainly described based on FIG. 12 to FIG. 14.

*Description of Structure*

Based on FIG. 12, the structure of the network inspection system 100 is described.

The structure of the network inspection system 100 is identical to the structure in Embodiment 1, except part of the network inspection apparatus 200 (refer to FIG. 1).

Based on FIG. 13, the structure of the network inspection apparatus 200 is described.

The network inspection apparatus 200 further includes a communication managing unit 231. The communication managing unit 231 is implemented by software.

The network inspection program further causes a computer to function as the communication managing unit 231.

The other structures are identical to those in Embodiment 1 (refer to FIG. 2).

*Description of Operation*

Based on FIG. 14, a network inspection method is described.

At step S301, the communication status checking unit 211 selects one unselected communication network. The switching unit 213 switches the connection destination to the selected network.

Step S301 is identical to the process in Embodiment 1 (step S101 and step S102).

At step S311, the communication status checking unit 211 checks a communication status of the selected network.

Step S311 is identical to step S111 in Embodiment 1.

At step S312, the communication status checking unit 211 determines whether inspection of the selected network is possible based on the communication status of the selected network.

Step S312 is identical to step S112 in Embodiment 1.

When it is determined that inspection of the selected network is possible, the process proceeds to step S322.

When it is determined that inspection of the selected network is not possible, the process proceeds to step S321.

At step S321, the communication status checking unit 211 notifies the communication managing unit 231 of the determination result that inspection of the selected network is not possible.

The communication managing unit 231 transmits a communication stop instruction to each node of the selected network. The communication stop instruction is a signal for making an instruction for stopping communication. For example, the communication managing unit 231 transmits the communication stop instruction to the selected network in a broadcast manner.

Then, the communication managing unit 231 notifies the basic signal output unit 212 of the completion of the communication stop instruction.

At step S322, the basic signal output unit 212 outputs a basic signal to the selected network.

Step S322 is identical to step S121 in Embodiment 1.

Step S331 to step S341 are identical to the process in Embodiment 1 (step S131 to step S141).

*Effect of Embodiment 3*

When network inspection cannot be performed because of being affected by the communication status, the communication managing unit 231 instructs each node of the communication network to stop communication. This allows network inspection to be performed.

*Example of Embodiment 3*

Embodiment 3 may be implemented in combination of Embodiment 2.

In this case, the network inspection apparatus 200 in Embodiment 3 includes the phase shift circuit 286 which shifts the phase of the basic signal. And, the node determining unit 221 restores the waveform of the inspection signal by using one or more sampling values of each of a plurality of inspections signals, and makes a determination based on the restored waveform.

Embodiment 4

As for a mode of addressing a case in which contention has occurred between a communication signal and an inspection signal, differences from Embodiment 1 are mainly described based on FIG. 15 to FIG. 19.

*Description of Structure*

Figure 15:
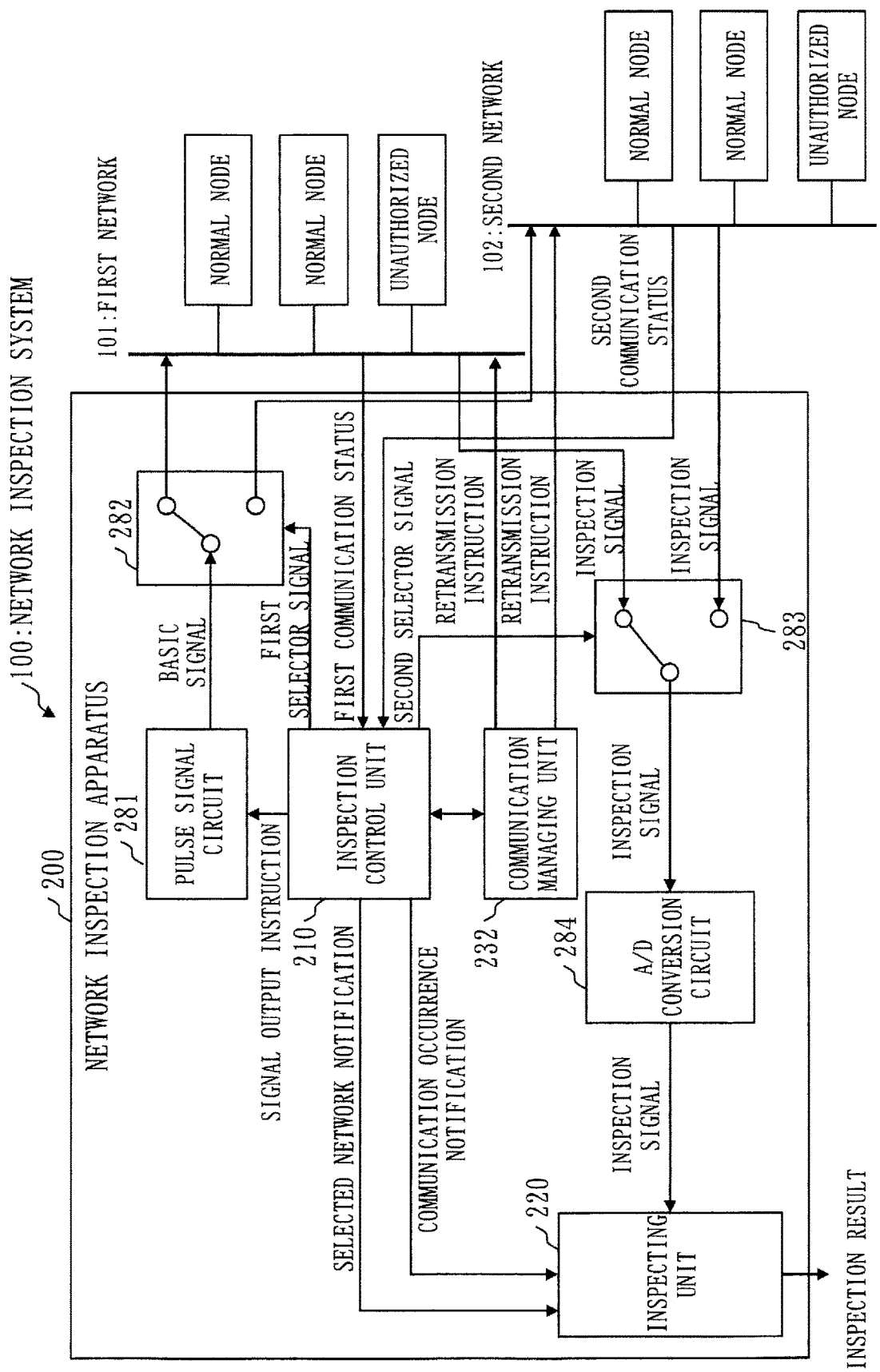
FIG. 15 is a structure diagram of the network inspection system 100 in Embodiment 4.

Based on FIG. 15, the structure of the network inspection system 100 is described.

The structure of the network inspection system 100 is identical to the structure in Embodiment 1, except part of the network inspection apparatus 200 (refer to FIG. 1).

Figure 16:
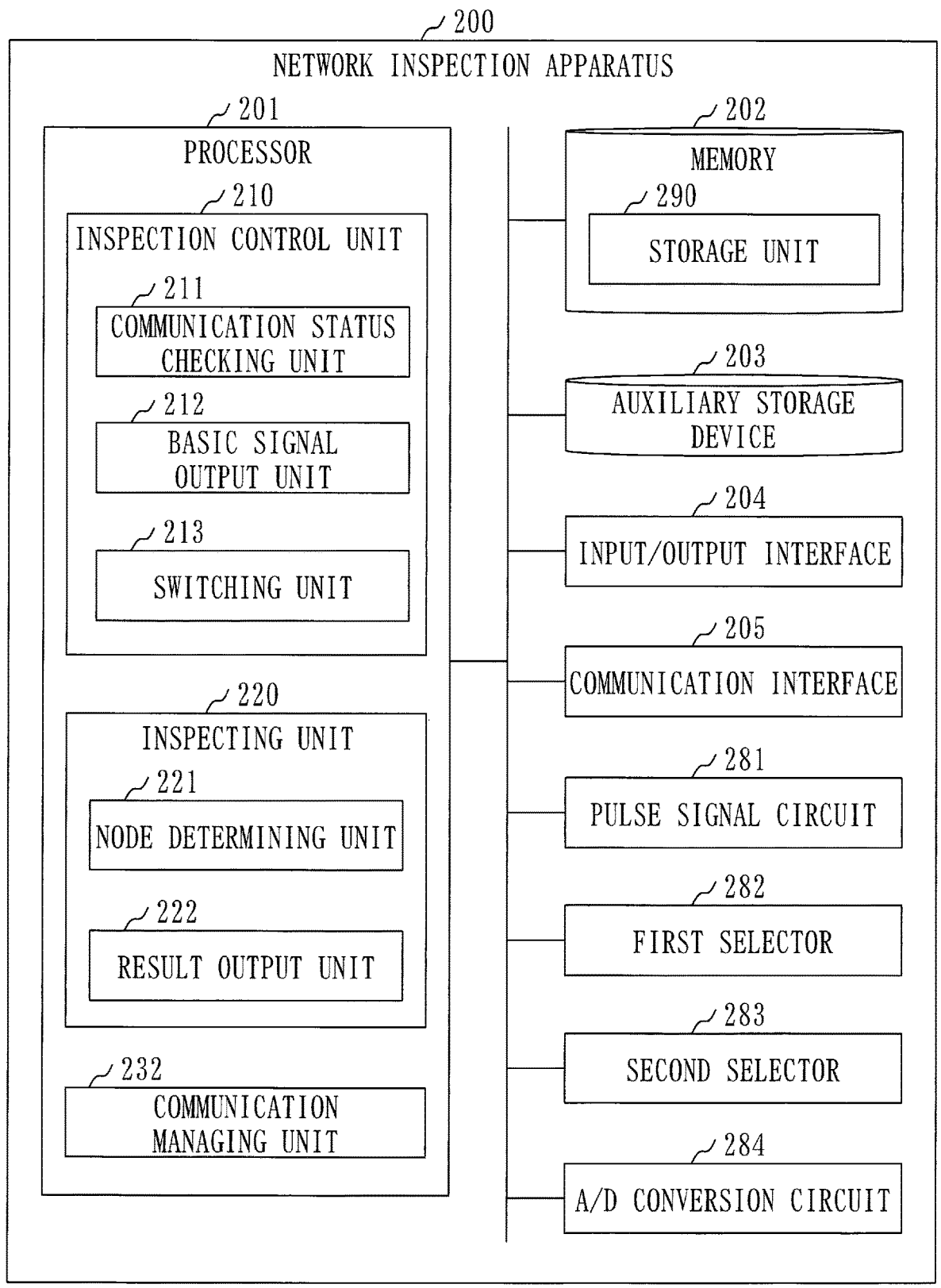
FIG. 16 is a structure diagram of the network inspection apparatus 200 in Embodiment 4.

Based on FIG. 16, the structure of the network inspection apparatus 200 is described.

The network inspection apparatus 200 further includes a communication managing unit 232. The communication managing unit 232 is implemented by software.

The network inspection program further causes a computer to function as the communication managing unit 232.

The other structures are identical to those in Embodiment 1 (refer to FIG. 2).

*Description of Operation*

Figure 17:
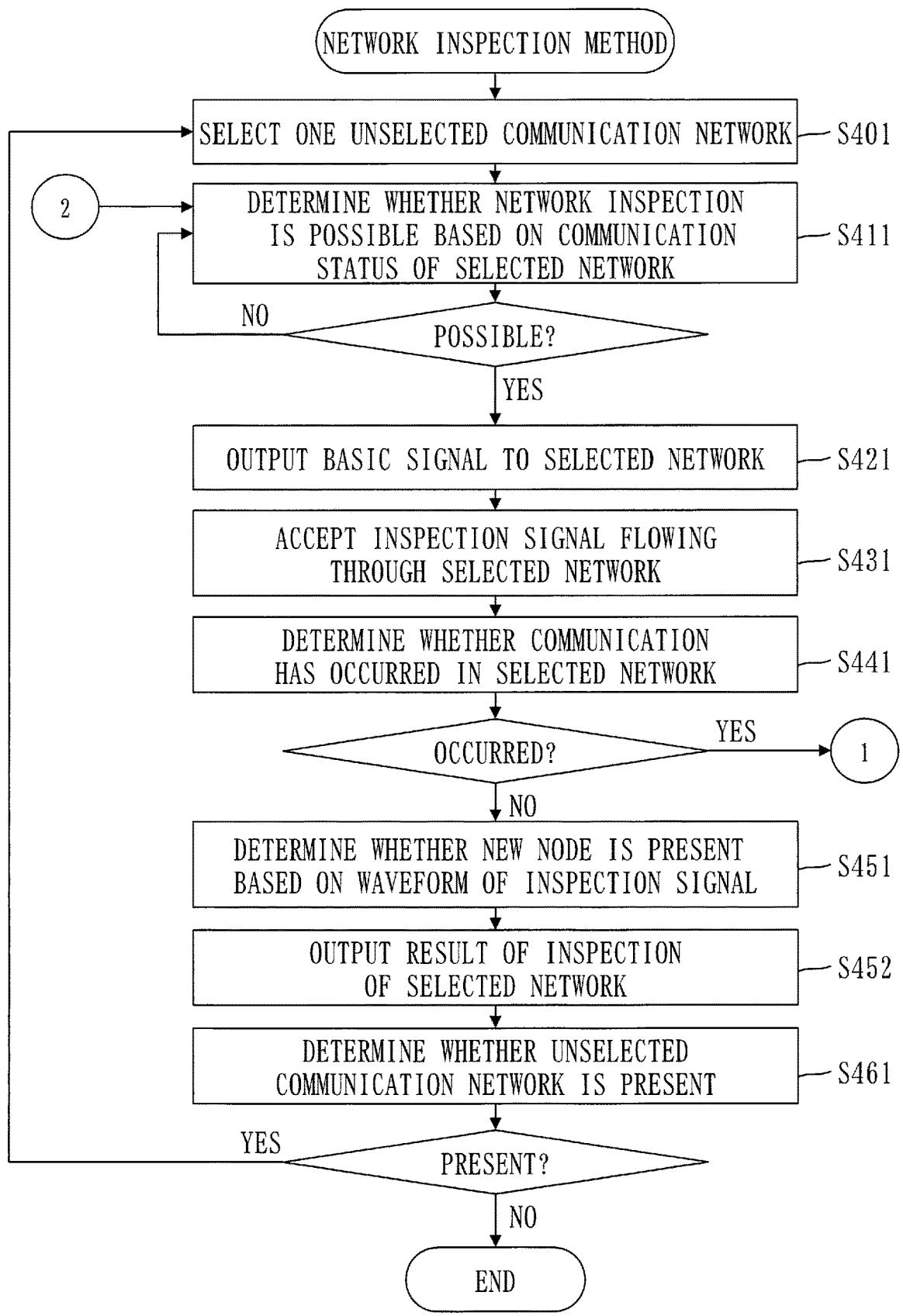
FIG. 17 is a flowchart of a network inspection method in Embodiment 4.
Figure 18:
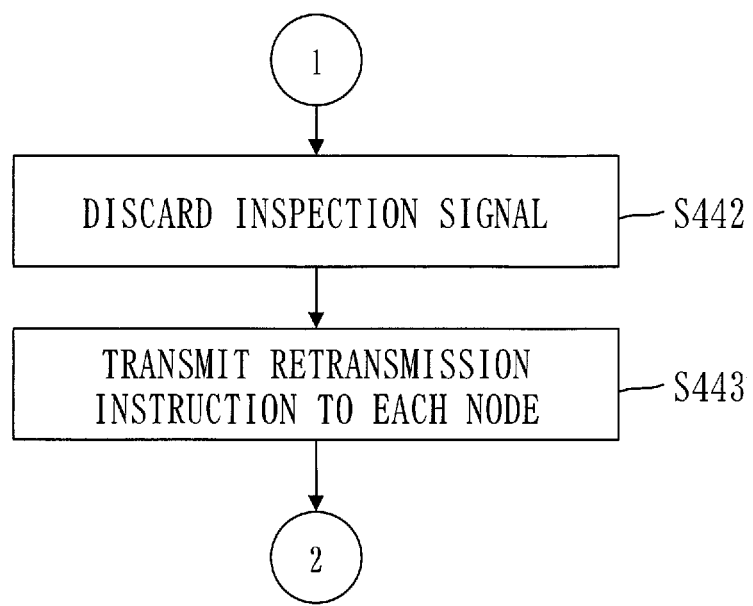
FIG. 18 is the flowchart of the network inspection method in Embodiment 4.

Based on FIG. 17 and FIG. 18, a network inspection method is described.

At step S401, the communication status checking unit 211 selects one unselected communication network. The switching unit 213 switches the connection destination to the selected network.

Step S401 is identical to the process in Embodiment 1 (step S101 and step S102).

At step S411, the communication status checking unit 211 determines whether inspection of the selected network is possible based on the communication status of the selected network.

Step S411 is identical to the process in Embodiment 1 (step S111 and step S112).

When it is determined that inspection of the selected network is possible, the process proceeds to step S421.

When it is determined that inspection of the selected network is not possible, the process proceeds to step S411.

At step S421, the basic signal output unit 212 outputs a basic signal to the selected network.

Step S421 is identical to step S121 in Embodiment 1.

At step S431, the node determining unit 221 accepts an inspection signal flowing through the selected network.

Step S431 is identical to step S131 in Embodiment 1.

From the start of step S421 to the end of step S431, the communication status checking unit 211 continues to check the communication status of the selected network.

At step S441, the communication status checking unit 211 determines whether communication has occurred in the selected network in an observation time.

The observation time is a time from the start of step S421 to the end of step S431. That is, the observation time is a time from a time when the basic signal is outputted to the selected network to a time when the inspection signal is accepted.

When it is determined that communication has occurred in the selected network, the process proceeds to step S442.

When it is determined that communication has not occurred in the selected network, the process proceeds to step S451.

At step S442, the communication status checking unit 211 notifies the node determining unit 221 of the occurrence of communication.

Then, the node determining unit 221 discards the accepted inspection signal.

At step S443, the communication status checking unit 211 notifies the communication managing unit 232 of the occurrence of communication.

The communication managing unit 232 transmits a retransmission instruction to each node of the selected network. The retransmission instruction is a signal for making an instruction for retransmitting the communication signal transmitted within a predetermined time. For example, the communication managing unit 232 transmits the retransmission instruction to the selected network in a broadcast manner.

Then, the communication managing unit 232 notifies the communication status checking unit 211 of the completion of the retransmission instruction.

After step S443, the process proceeds to step S411.

Step S451 to step S461 are identical to the process in Embodiment 1 (step S132 to step S141).

Figure 19:
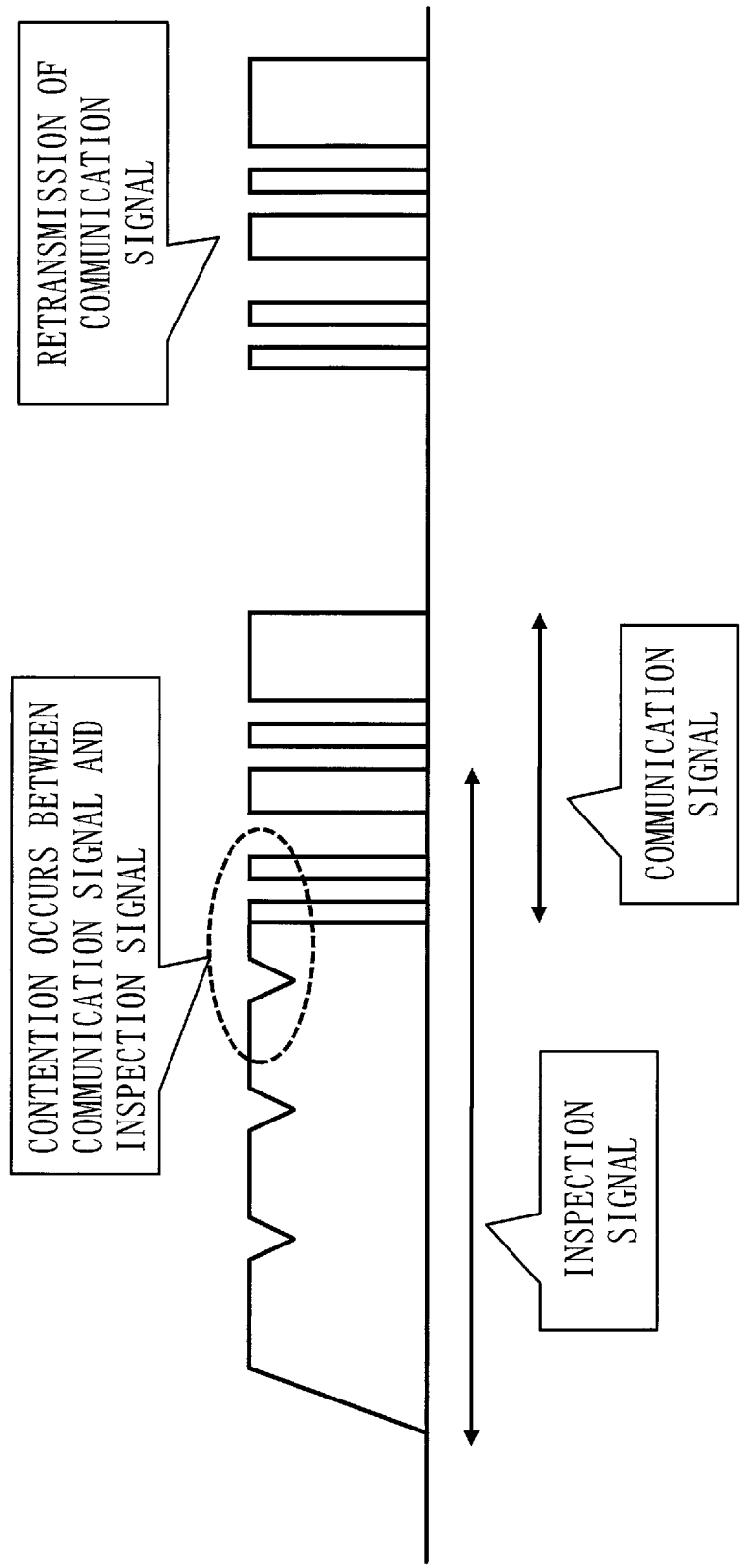
FIG. 19 is a descriptive diagram of retransmission of a communication signal in Embodiment 4.

Based on FIG. 19, the retransmission instruction by the communication managing unit 232 is described.

It is assumed that a communication signal is caused to flow through the selected network in a period from a time when outputting a basic signal from the network inspection apparatus 200 to the selected network starts to a time when inputting an inspection signal from the selected network to the network inspection apparatus 200 is completed.

In this case, contention occurs mutually between the communication signal and the inspection signal. As a result, the network inspection apparatus 200 cannot acquire a correct inspection signal, and each node cannot acquire a correct communication signal.

Thus, the node determining unit 221 discards the acquired inspection signal. Also, the communication managing unit 232 transmits a retransmission instruction to each node. Then, each node performs retransmission of the communication signal.

\*\*\*Effect of Embodiment 4\*\*\*

If contention has occurred between the communication signal and the inspection signal, the communication managing unit 232 instructs each node of the communication network to make retransmission. This allows normal communication in the communication network to be kept.

Then, when it is determined that network inspection is possible, the basic signal output unit 212 newly outputs a basic signal to the communication network. This allows the communication network to be correctly inspected.

\*\*\*Example of Embodiment 4\*\*\*

Embodiment 4 may be implemented in combination of Embodiment 2.

In this case, the network inspection apparatus 200 in Embodiment 4 includes the phase shift circuit 286 which shifts the phase of the basic signal. And, the node determining unit 221 restores the waveform of the inspection signal by using one or more sampling values of each of a plurality of inspections signals, and makes a determination based on the restored waveform.

\*\*\*Supplement to Embodiments\*\*\*

Figure 20:
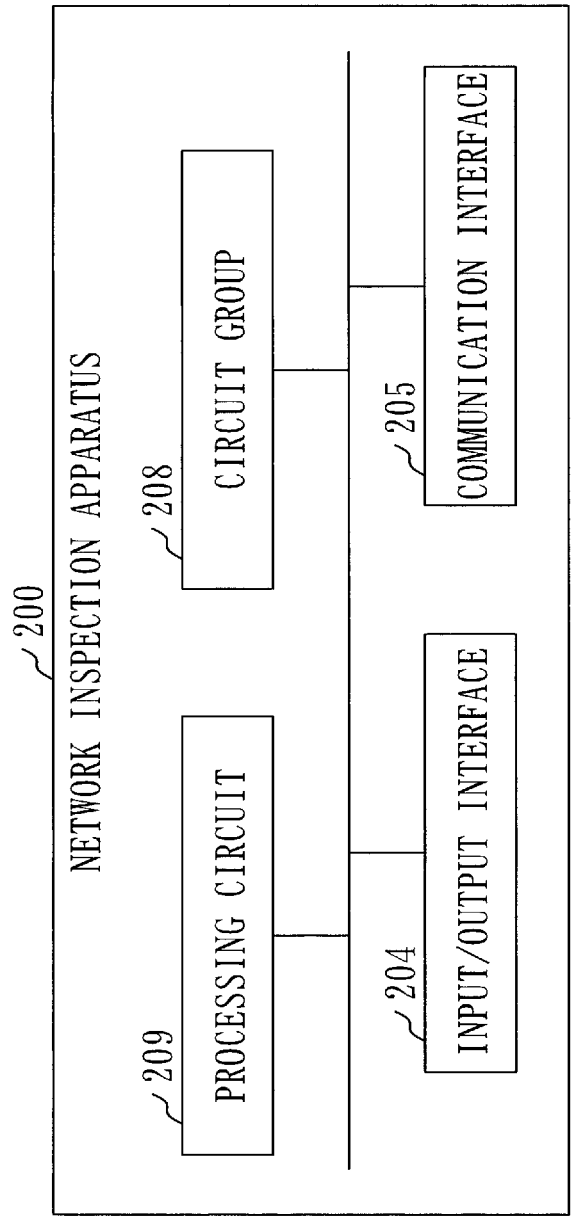
FIG. 20 is a hardware structure diagram of the network inspection apparatus 200 of the embodiments.

Based on FIG. 20, the hardware structure of the network inspection apparatus 200 is described.

A circuit group 208 is a set of the pulse signal circuit 281, the first selector 282, the second selector 283, and the A/D conversion circuit (284, 285).

The network inspection apparatus 200 includes a processing circuitry 209.

The processing circuitry 209 is a piece of hardware which implements the inspection control unit 210, the inspecting unit 220, and the communication managing unit (231, 232).

The processing circuitry 209 may be a dedicated piece of hardware or may be the processor 201 which executes the program stored in the memory 202.

When the processing circuitry 209 is a dedicated piece of hardware, the processing circuitry 209 is, for example, a single circuit, composite circuit, programmed processor, parallel-programmed processor, ASIC, FPGA, or a combination of these.

ASIC is an abbreviation of Application Specific Integrated Circuit.

FPGA is an abbreviation of Field Programmable Gate Array.

The network inspection apparatus 200 may include a plurality of processing circuits which replace the processing circuitry 209. The plurality of processing circuits share the role of the processing circuitry 209.

In the network inspection apparatus 200, part of the functions may be implemented by dedicated hardware and the remaining functions may be implemented by software or firmware.

As described above, the processing circuitry 209 can be implemented by hardware, software, firmware, or a combination of these.

The embodiments are examples of preferable embodiment and are not intended to restrict the technical scope of the present invention. The embodiments may be partially implemented or may be implemented in combination of another embodiment. The procedures described by using the flowcharts and so forth may be changed as appropriate.

The circuits such as the pulse signal circuit 281, the first selector 282, the second selector 283, and the A/D conversion circuit (284, 285) may be provided outside the network inspection apparatus 200.

The network inspection apparatus 200 may be implemented by a plurality of devices. For example, the network inspection apparatus 200 may be implemented by a device which implements the inspection control unit 210, a device which implements the inspecting unit 220, and a device which implements the communication managing unit (231, 232).

The "unit" which is component of the network inspection apparatus 200 may be read as "process" or "step".

REFERENCE SIGNS LIST

100: network inspection system; 101: first network; 102: second network; 111: basic signal; 112: inspection signal; 113: reference signal; 200: network inspection apparatus; 201: processor; 202: memory; 203: auxiliary storage device; 204: input/output interface; 205: communication interface; 208: circuit group; 209: processing circuitry; 210: inspection control unit; 211: communication status checking unit; 212: basic signal output unit; 213: switching unit; 220: inspecting unit; 221: node determining unit; 222: result output unit; 231: communication managing unit; 232: communication managing unit; 281: pulse signal circuit; 282: first selector; 283: second selector; 284: A/D conversion circuit; 285: A/D conversion circuit; 286: phase shift circuit; 290: storage unit

The invention claimed is:

1. A network inspection system comprising:
processing circuitry to:
check a communication status of a communication network to which one or more nodes are connected and to determine, based on the communication status, whether inspection of the communication network is possible,
output, when it is determined that inspection of the communication network is possible, a basic signal, which is a pulse signal for inspecting the communication network, to the communication network, and
accept an inspection signal, which is a basic signal with a waveform changed by flowing through the communication network, and to determine, based on the waveform of the inspection signal, whether a new node connected to the communication network is present; and a conversion circuit to convert an analog signal to digital data, wherein the processing circuitry outputs a plurality of said basic signals to the communication network as shifting phases, the conversion circuit samples each of a plurality of said inspection signals corresponding to the plurality of basic signals, thereby acquiring one or more sampling values for each of the inspection signals, and the processing circuitry accepts the one or more sampling values of each of the plurality of inspection signals, restores the waveforms of the inspection signals by using the one or more sampling values of each of the plurality of inspection signals, and makes a determination based on the restored waveforms.

2. The network inspection system according to claim 1, comprising:

a phase shift circuit to shift a phase of the pulse signal, wherein the processing circuitry instructs the phase shift circuit to perform phase shift of the basic signal, and checks the communication status of the communication network by using a time after the instruction to the phase shift circuit until the phase shift in the phase shift circuit becomes stabilized.

3. The network inspection system according to claim 1, wherein the processing circuitry instructs, when it is determined that inspection of the communication network is not possible, each node connected to the communication network to stop communication.

4. The network inspection system according to claim 2, wherein the processing circuitry instructs, when it is determined that inspection of the communication network is not possible, each node connected to the communication network to stop communication.

5. The network inspection system according to claim 1, wherein the processing circuitry sequentially switches, among a plurality of communication networks, a communication network as an output destination of the basic signal and to switch a communication network as an input source of the inspection signal to the output destination.

6. The network inspection system according to claim 2, wherein the processing circuitry sequentially switches, among a plurality of communication networks, a communication network as an output destination of the basic signal and to switch a communication network as an input source of the inspection signal to the output destination.

7. The network inspection system according to claim 3, wherein the processing circuitry sequentially switches, among a plurality of communication networks, a communication network as an output destination of the basic signal and to switch a communication network as an input source of the inspection signal to the output destination.

8. The network inspection system according to claim 4, wherein the processing circuitry sequentially switches, among a plurality of communication networks, a communication network as an output destination of the basic signal and to switch a communication network as an input source of the inspection signal to the output destination.

9. The network inspection system according to claim 1, wherein the processing circuitry determines whether communication has occurred in the communication network in an observation time from a time when the basic signal is outputted to the communication network until the inspection signal is accepted, and if communication has occurred in the communication network in the observation time, the basic signal output unit newly outputs the basic signal to the communication network.

10. The network inspection system according to claim 9, wherein the processing circuitry instructs, if communication has occurred in the communication network in the observation time, each node connected to the communication network to make retransmission.

11. The network inspection system according to claim 9, wherein the processing circuitry sequentially switches, among a plurality of communication networks, a communication network as an output destination of the basic signal and to switch a communication network as an input source of the inspection signal to the output destination.

12. The network inspection system according to claim 10, wherein the processing circuitry sequentially switches, among a plurality of communication networks, a communication network as an output destination of the basic signal and to switch a communication network as an input source of the inspection signal to the output destination.

13. A non-transitory computer readable medium storing a network inspection program that causes a computer to execute:

a communication status checking process of checking a communication status of a communication network to which one or more nodes are connected and determining, based on the communication status, whether inspection of the communication network is possible;

a basic signal output process of outputting, when it is determined that inspection of the communication network is possible, a basic signal, which is a pulse signal for inspecting the communication network, to the communication network;

a node determining process of accepting an inspection signal, which is a basic signal with a waveform changed by flowing through the communication network, and determining, based on the waveform of the inspection signal, whether a new node connected to the communication network is present; and a conversion process of converting an analog signal to digital data, wherein the basic signal output process outputs a plurality of said basic signals to the communication network as shifting phases, the conversion process samples each of a plurality of said inspection signals corresponding to the plurality of basic signals, thereby acquiring one or more sampling values for each of the inspection signals, and the node determining process accepts the one or more sampling values of each of the plurality of inspection signals, restores the waveforms of the inspection signals by using the one or more sampling values of each of the plurality of inspection signals, and makes a determination based on the restored waveforms.

14. The non-transitory computer readable medium according to claim 13, wherein the communication status checking process determines whether communication has occurred in the communication network in an observation time from a time when the basic signal is outputted to the communication network until the inspection signal is accepted, and if communication has occurred in the communication network in the observation time, the basic signal output process newly outputs the basic signal to the communication network.

* * * * *